US012055760B2

(12) United States Patent
Schiffer et al.

(10) Patent No.: US 12,055,760 B2
(45) Date of Patent: Aug. 6, 2024

(54) SYSTEMS, DEVICES AND METHODS FOR OPTICAL BEAM COMBINING

(71) Applicant: ELBIT SYSTEMS ELECTRO-OPTICS ELOP LTD, Rehovot (IL)

(72) Inventors: Zeev Schiffer, Rehovot (IL); Daniel Levy, Rehovot, IL (US); Ran Zvi Marom, Rehovot (IL)

(73) Assignee: ELBIT SYSTEMS ELECTRO-OPTICS ELOP LTD., Rehovot (IL)

( * ) Notice: Subject to any disclaimer, the term of this patent is extended or adjusted under 35 U.S.C. 154(b) by 314 days.

(21) Appl. No.: 17/433,845

(22) PCT Filed: Feb. 23, 2020

(86) PCT No.: PCT/IL2020/050195
§ 371 (c)(1),
(2) Date: Aug. 25, 2021

(87) PCT Pub. No.: WO2020/174461
PCT Pub. Date: Sep. 3, 2020

(65) Prior Publication Data
US 2022/0146754 A1 May 12, 2022

(30) Foreign Application Priority Data

Feb. 25, 2019 (IL) .......................................... 265027
Dec. 2, 2019 (IL) .......................................... 271130

(51) Int. Cl.
*G02B 6/293* (2006.01)
*G02B 27/10* (2006.01)
*G02B 27/12* (2006.01)

(52) U.S. Cl.
CPC ....... *G02B 6/2938* (2013.01); *G02B 6/29305* (2013.01); *G02B 6/29308* (2013.01);
(Continued)

(58) Field of Classification Search
CPC ............ G02B 6/29305; G02B 6/29308; G02B 6/2938; G02B 27/1006; G02B 27/1086; G02B 27/123
See application file for complete search history.

(56) References Cited

U.S. PATENT DOCUMENTS 6,198,864 B1 * 3/2001 Lemoff ................ G02B 6/2938
385/47
10,551,626 B2 * 2/2020 Marciante ............. H01S 3/0675
(Continued)

FOREIGN PATENT DOCUMENTS

CN 101159365 A 4/2008
CN 107240856 A 10/2017
WO 2007100752 A2 9/2007

OTHER PUBLICATIONS

Augst SJ et al: "Coherent and spectral beam combining of fiber lasers", Fiber Lasers IX: Technology, Systems, and Applications, SPIE, 1000 20th St. Bellingham WA 98225-6705 USA, vol. 8237, No. 1, Mar. 8, 2012 (Mar. 8, 2012), pp. 1-10, XP060023354, DOI: 10.1117/12.905759; [retrieved on Jan. 1, 1901] ; abstract; figure 1.
(Continued)

*Primary Examiner* — Daniel Petkovsek
(74) *Attorney, Agent, or Firm* — S.J. Intellectual Property Ltd.

(57) ABSTRACT

Aspects of embodiments pertain to beam combining devices for coherent and spectral beam-combining. The coherent beam combining (CBC) device may comprise a monolithic body having an input surface and an output surface. The input surface may be configured to direct a plurality of coherent entering optical beams through an optical pathway inside the monolithic body towards the output surface; and a phase mask configured for combining beams, exiting from the output surface of the monolithic body, to form a single combined output beam. The Spectral beam combining (SBC) device may include a monolithic body configured to direct the entering optical beams through a multi-diffraction
(Continued)

optical pathway inside the monolithic body by directing the entering optical beams such as to impinge a diffractive surface thereof at least twice, for combining the entering optical beams into a single multispectral combined output optical beam. Embodiments may also include methods for cascaded beam combining, using multiple combining devices in a network configuration.

19 Claims, 17 Drawing Sheets

(52) U.S. Cl.
CPC ..... *G02B 27/1006* (2013.01); *G02B 27/1086* (2013.01); *G02B 27/123* (2013.01)

(56) References Cited

U.S. PATENT DOCUMENTS

| | | |
|---|---|---|
| 2004/0141681 A1 | 7/2004 | Weverka et al. |
| 2017/0082863 A1 | 3/2017 | Marciante |
| 2018/0329216 A1 | 11/2018 | Huang et al. |

OTHER PUBLICATIONS

Coherent and Spectral Beam Combining of Fiber Lasers; S. J. Augst et al. Proc. of SPIE vol. 8237 823704-1; Downloaded From: http://proceedings.spiedigitallibrary.org/ on May 19, 2015 Terms of Use: http://spiedl.org/terms.

* cited by examiner

```
┌─────────────────────────────────────────────────────────────┐
│ Providing a CBC device that has a monolithic body and a phase │
│ mask, where the phase mask is configured to combine coherent  │
│ optical beams.                                         801    │
└─────────────────────────────────────────────────────────────┘
                              ↓
┌─────────────────────────────────────────────────────────────┐
│ Directing multiple coherent optical beams into the monolithic │
│ body (e.g. by using waveguides), at a specific entry angle in │
│ respect to a main axis.                                802    │
└─────────────────────────────────────────────────────────────┘
                              ↓
┌─────────────────────────────────────────────────────────────┐
│ Directing the entering optical beams inside the monolithic body │
│ such that the entering beams converge into a focal point       │
│ defining a focal plane, where the phase mask of the CBC device │
│ being located over the focal plane.                    803    │
└─────────────────────────────────────────────────────────────┘
                              ↓
┌─────────────────────────────────────────────────────────────┐
│ Combining the optical beams impinging the phase mask of the   │
│ CBC device                                             804    │
└─────────────────────────────────────────────────────────────┘
                              ↓
┌─────────────────────────────────────────────────────────────┐
│ Outputting a single coherent combined output optical beam and │
│ directing thereof externally from the CBC device.      805    │
└─────────────────────────────────────────────────────────────┘
```

FIG. 15

Providing a SBC device that has a monolithic body having at least an input surface, an output surface and a diffractive surface, where the SBC device is configured for SBC via a multi-diffraction optical pathway. 811

Directing multiple spectrally differentiated optical beams into the monolithic body 812

Combining the entering optical beams by directing thereof inside the monolithic body through a multi-diffraction optical pathway by directing the entering optical beams such as to impinge the diffractive surface at least twice 813

Outputting a single multispectral combined output optical beam and directing thereof externally from the SBC device. 814

FIG. 16

Providing a first set of coherent beam combining (CBC) devices, each may include a monolithic body and a phase mask, being configured to combine a plurality of coherent entering optical beams into a single coherent combined output optical beam where the output optical beams are spectrally the same, overlapping or differentiated   821

Providing at least one additional combining device (e.g. SBC/CBC device) configured for combining all combined output optical beams outputted by the first set of CBC devices and directed thereto and for outputting a final combined output optical beam.   822

Directing the optical beams emanating from the first set of CBC devices, towards an input surface of the at least one additional combining device   823

Combining the optical beams directed and entering the at least one additional combining device.   824

Outputting a single combined final output optical beam and directing thereof externally from the monolithic body of the at least one additional combining device.   825

FIG. 17

SYSTEMS, DEVICES AND METHODS FOR OPTICAL BEAM COMBINING

The present disclosure relates in general to devices, apparatuses, systems and components for combining of multiple optical beam.

BACKGROUND

Optical amplifiers are vastly used in many systems for a growing number of industries and applications, especially for systems requiring high power laser output.

Optical amplifiers are devices or systems that enable amplification of optical signals by using optical instrumentation and/or elements, without requiring conversion of the optical signal to be amplified, to non-optical signals such as to electrical signals, and then back to optical signals. Several methods for optical amplification include doped fiber amplification (DFA), in which one or more doped optical waveguides such as double clad doped optical fibers are used for power scaling of optical input. One type of DFA includes fiber lasers, using doped optical fibers as gain medium.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 15 shows a flowchart of a method for coherent beam combining, according to some embodiments.

FIG. 16 shows a flowchart of a method for spectral beam combining, according to some embodiments.

FIG. 17 shows a flowchart of a method for cascaded beam combining, according to some embodiments.

DETAILED DESCRIPTION

Figure 1:
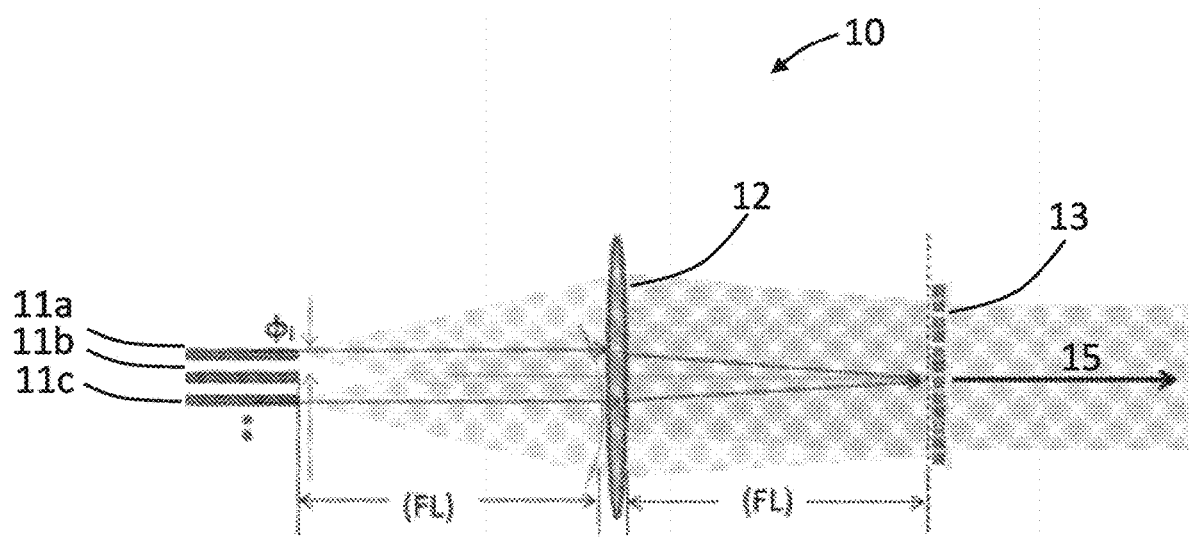
FIG. 1 shows a background art setup for coherent beam combing.

Aspects of disclosed embodiments pertain to devices and system for optical amplification by combining of multiple beams emanating from multiple light sources such as from multiple optical fibers.

Fiber lasers, used as optical amplifiers for power scaling, use one or more optical fibers such as doped optical fibers (also referred to as "doped fibers") as their gain medium. Beam quality and/or maximal gain power of the output beam of a fiber laser may be influenced by several physical effects such as stimulated Brillouin scattering (SBS), stimulated Raman scattering (SRS) and/or modal thermal instabilities. These effects may limit physical properties of the fiber laser output beam such as limit the output beam quality and/or maximal output beam power.

The term "doped optical fiber" relates to any type of optical fiber doped with one or more elements such as, yet not limited to, erbium, dysprosium, ytterbium, neodymium, thulium, praseodymium, and/or holmium.

The term "optical beam" or "beam" used (interchangeably) herein may refer to any propagating electromagnetic signal, field and/or wave in the optical wavelengths range.

The term "beam quality" may relate to any one or more beam characteristics, such as, yet not limited to: wave front (profile) quality, beam waste, beam radius, beam divergence, beam intensity/amplitude, beam brightness level (radiance), phase deviation (phase coherence), and the like and/or the maintaining over time and/or distance of these beam characteristics.

To overcome some of the limiting physical effects in fiber lasers or in other DFA based devices and systems such as output power and/or near diffraction beam quality limitations, beam combining may be used, involving combining of a multiplicity of optical beams optionally emanating from several optical waveguides (such as core doped or any other type of optical fibers) into a single optical beam at least for improving power scaling and/or beam quality.

Two beam combining techniques may be used: spectral beam combining (SBC) and coherent beam combining (CBC).

SBC may be generally described as combining of multiple beams emanating from multiple beam sources, where the beams are of different wavelengths (e.g. non-overlapping or partially overlapping wavelength bands). For SBC, the layout of optical elements used for combining (i.e. the spectral combiner device or spectral combiner) should be wavelength-sensitive and configured for enabling all beams to eventually propagate at the output thereof, in the same propagation direction forming a wide-band output beam that propagates in a single unified outward direction. SBS devices may be configured for maintaining wavelengths of all entering beams.

CBC may be generally described as a method for combining coherent optical beams having similar, overlapping or identical wavelengths or wavelength narrow bands for outputting an (e.g., power-scaled) coherent narrow-band output beam propagating in a single unified outward direction, e.g., by controlling the phase of the entering beams, for example, to obtain constructive interference at the output. In CBC, at the input, the coherent optical beams may have (substantially) identical phases.

FIG. 1 shows an optional layout of a background art CBC optical system 10 for combining multiple beams (which may be of coherent i.e. of similar, identical or overlapping wavelengths) emanating from multiple optical fibers 11a, 11b and 11c, having a collimating lens 12 for focusing the beams to a single focal plane, where a diffraction grating element (DOE) 13 is positioned, for combining the collimated beams into a single combined output beam 15. The elements of this CBC optical system 10 i.e. the lens 12 fibers 11a-11c and the DOE 13 are all separated from one another and therefor require holding each element in position for alignment thereof in a separated manner. This configuration is extremely sensitive to physical instabilities since it requires a high level of alignment between all the optical elements of the CBC optical system 10, in order to produce and maintain a high output beam quality. Any movements such as slight quakes of the lens 12, DOE 13 and/or displacements of the optical fibers 10a-10c output surfaces relative to each other can affect the entire combining process and quality.

Aspects of disclosed embodiments pertain to beam combining devices for coherent beam-combining of multiple optical beams (herein "entering beams") emanating from a plurality of optical fibers including at least: a monolithic body and a phase mask configured for CBC of the entering beams, to form a single combined optical beam outputted therefrom (herein "output beam").

According to some embodiments, the monolithic body may be configured for focusing all entering beams into a single focal point, where the phase mask may be positioned over a plane that includes the focal point. For example, the monolithic body may be configured such that the entering beams directed therethrough converge at the focal point at the same exit separation angle from one another, such that the separation angle and the focal point define a focal plane over which the phase mask is positioned The phase mask may be an integral part of the monolithic body or embedded in a separate optical element. In cases in which a separate optical element is used, the optical element, having the phase mask embedded therein, may be positioned at distance from the monolithic body and externally thereto, when the monolithic body is configured such that the focal point and focal plane are external thereto, or coupled to at least one side of the monolithic body, in cases in which the focal plane is located over one side of the monolithic body.

The disclosed CBC device embodiments are designed for providing improved stability of each CBC device's components in respect to one another in order to reduce or prevent output beam quality reduction caused by physical relative movements at least between some of those components. Other advantages of the disclosed CBC devices may include enabling using an increased number of optical fibers and therefore increase the gain (output power), while keeping high output beam quality.

For example, in some embodiments the relative movements between the monolithic body and the plurality of optical fibers may be reduced or prevented by fixedly connecting those optical fibers to the monolithic body, e.g. by welding, fusing, splicing or any other form of fixed connection of the fibers to the monolithic body Additionally or alternatively, the monolithic body may be designed such as to incorporate one or more collimating lenses as an integral part of the monolithic body for preventing relative movements therebetween. Additionally or alternatively, the OE(s) of the CBC device may be integrally or non-integrally (yet, e.g., fixedly) attached to the output surface of the monolithic body for preventing relative movements thereof.

The CBC device may also be specifically designed to fit the number of entering beams, their separation angles as well as to one or more properties of each of the entering beams, such as wavelength, wavelengths band, phase, amplitude, polarization, beam radius, beam coherence, etc.

According to some embodiments, each optical fiber may be operatively associated with (e.g. connected to) a light source, at an input end thereof, and output light guided thereby, from an output end thereof. The beam of light outputted from the output end of the optical fiber may be referred to as the entering beam thereof, as it enters the monolithic body.

According to some embodiments, the monolithic body may be a three-dimensional (3D) object that is at least partially transparent, having at least an input surface and an output surface. The input surface may be configured to fixedly connect to the plurality of optical fibers (e.g. by fusion, welding, slicing, gluing, etc.), where the geometry of the monolithic body may be configured to direct a plurality of entering beams of light, entering thereinto from the plurality of optical fibers, towards an output surface thereof.

According to some embodiments, the optical fibers connections to the input surface of the monolithic body may define "engagements spots" which may be points or areas over the input surface of the monolithic body, engaging the output ends of the optical fibers. The connection or engagement between the output ends of the optical fibers and the input surface of the monolithic body, may create (substantially) equal spacing between each couple of adjacent engagement spots, causing the entering beams to enter the monolithic body at specific desired entrance angles (e.g. in respect to a main axis) such that the relative angle between each couple of adjacent beams (defined as the "entry separation angle") is equal for each couple of adjacent beams, i.e. the entering beams enter the monolithic body, via the input surface thereof, at equal "entry separation angles" from one another.

According to some embodiments, the monolithic body may be configured such that the beams directed thereby, exit the output surface thereof at the same exit separation angle from one another and the phase mask may be designed in correspondence with the exit separation angle of the exiting beams.

According to some embodiments, the optical fibers, fixedly connecting to the input surface of the monolithic body may be an integral part of the beam combining device.

The optical fibers may be doped optical fibers and/or may be double cladded.

According to some embodiments the monolithic body has the monolithic body has one or more additional surfaces other than the input and output surfaces.

According to some embodiments the input surface or output surface may be curved, concaved or flat (also: straight).

The term "surface" used herein may relate to any type or shape of a surface such as a flat surface, a curved surface and the like.

According to some embodiments, the input surface of the monolithic body may be smoothed (polished) for improving engagement between the input surface and the output end of the optical fibers connecting thereto.

The monolithic body may be made from any transparent or partially transparent material such as glass, silica fused glass, acrylic glass, etc.

According to some embodiments, the monolithic body may be made from a transparent material of a single refractive index.

According to other embodiments the monolithic body may be made from a fully or partially transparent material having more than one refraction indices e.g. by having a gradient indexing or by having discretely varying indexing in different areas (volumes) in the monolithic body.

According to some embodiments, the properties of the monolithic body such as geometry, dimensions, refraction indexing, transparency and clarity rate, shape and dimensions etc. may all be designed and adapted for guiding entering beams from the input surface towards the output surface thereof in a certain manner such that the exiting beams exiting the output surface exit at desired exit angle in respect to a main axis (e.g. to fit the exit separation angle required by the design of the phase mask) and/or for converging the entering beams for focusing thereof into a single focal point. The properties of the monolithic body may also be adapted according to the manner in which the optical fibers are to engage the inner surface, the properties of the entering beams such as wavelength, beam dispersion etc. entry separation angle, as well as to the phase mask properties such as phase mask profile, positioning in relation to the output surface, size and dimensions etc.

Figure 2:
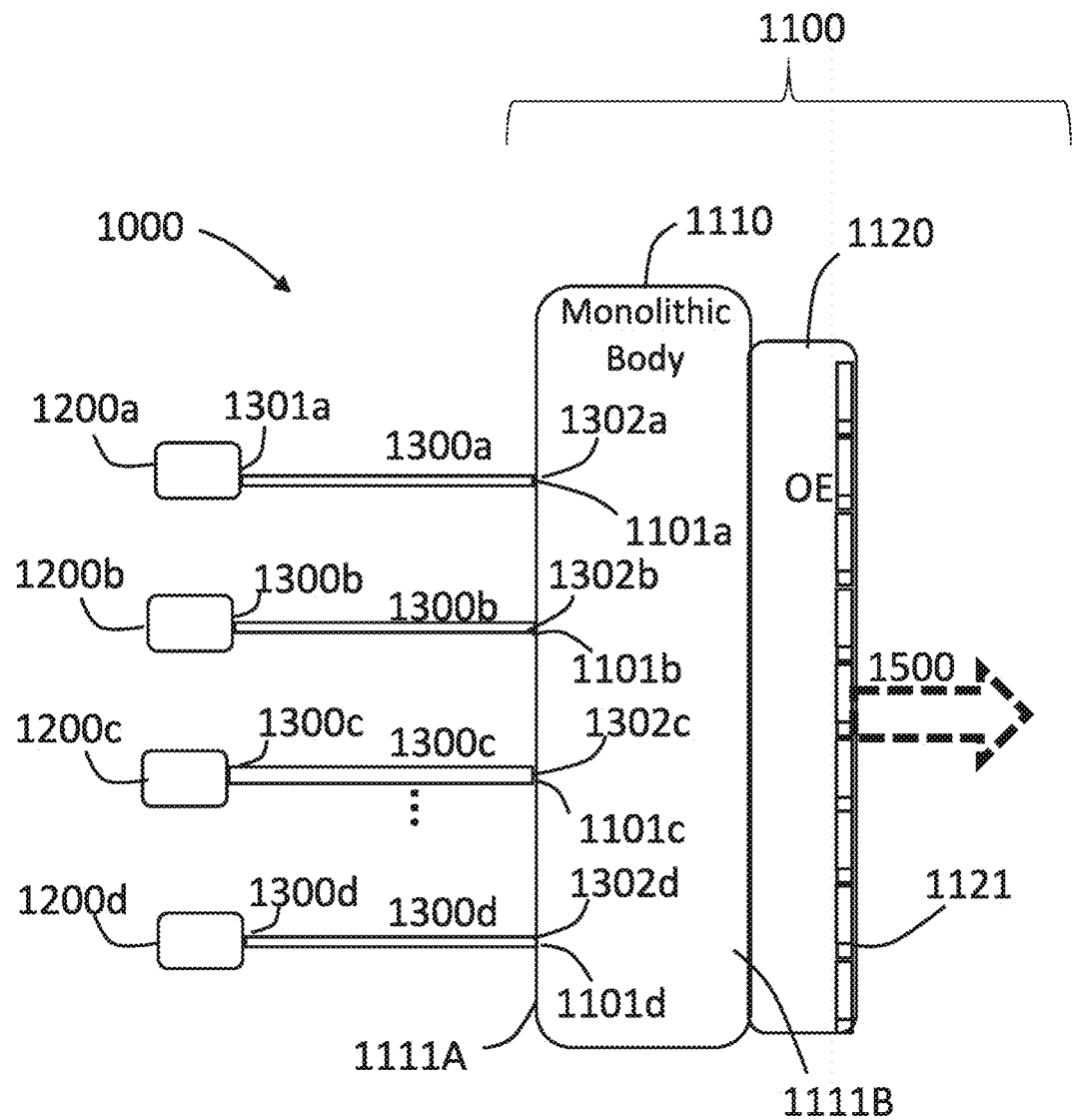
FIG. 2 shows a general layout of a coherent beam combining system for combining multiple optical beams emanating from multiple optical fibers that includes a monolithic body and an optical element having a phase mask, according to some embodiments.

Reference is made to FIG. 2 illustrating a CBC system 1000 for combining multiple optical beams emanating from multiple optical fibers, according to some embodiments. The CBC system 1000 may include: a beam combining device 1100, multiple light sources, such as light sources 1200a, 1200b, 1200c and 1200d, and multiple optical fibers such as optical fibers 1300a, 1300b, 1300c and 1300d, each optical fiber 1300a/1300b/1300c/1300d being fixedly connectable to the beam combining device 1100 and may be an integral part thereof.

According to some embodiments, the beam combining device 1100 may include a monolithic body 1110 and one or more optical elements such as optical element (OE) 1120 having a phase mask, e.g. by having the phase mask etched, engraved, embossed or adhered to one side (surface) of the OE 1120.

The monolithic body 1110 may be a 3D fully transparent or partially transparent element having an input surface 1111A and an output surface 1111B (side). The monolithic body 1110 may be configured to direct entering optical beams of light (herein also "entering beams"), outputted from output ends of the optical fibers 1300a-1300d and entering the monolithic body 1110 from the input surface 1111A thereof, towards the output surface 1111B. The OE 1120 may be coupled to the output surface 1111B of the monolithic body 1110 or located at a short distance from the output surface 1111B of the monolithic body 1110 (i.e. in a non-coupled position), and configured for combining light beams exiting the output surface 1111B (herein "exiting beams" or "exiting optical beams"). The OE 1120 features such as diffraction configuration, diffractive surface(s) design, dimensions and distance from the output surface 1111B of the monolithic body 1110, etc., may be designed to achieve optimal beam combining and may correspond to the design of the monolithic body 1110 as well as to beam properties of each of the entering and/exiting beams such as the wavelength, wavelength band, beam radius, beam dispersion, beam power, amplitude, polarization, etc. i.e. the properties of the beams when entering the input surface 1111A.

The beam properties of the exiting beams may be related to (i.e. dependent on) the beam properties of the entering beams (as outputted by the optical fibers) as well on the configuration of the monolithic body and the manner in which the optical fibers are connected to its input surface.

The properties of the entering and/or exiting beams may be known in advance for each CBC system 1000 such that the designs of the monolithic body 1110 and/or the OE 1120 and/or their relative positioning may be arranged for each CBC system requirements and features.

According to some embodiments, each optical fiber 1300a, 1300b, 1300c or 1300d may direct light originating from a respective light source 1200a, 1200b, 1200c or 1200d e.g. by having an input end of input ends 1301a, 1301b, 1301c, and 1301d of each of the optical fibers 1300a, 1300b, 1300c, and 1300d connecting to the outputs of their respective light source 1200a, 1200b, 1200c or 1200d. For example, optical fiber 1300a may direct light originating from light source 1200a etc.

Each of the light sources 1200a-1200d used, may include at least one light emitting device, configured for emitting light of the same, overlapping or a single wavelength or wavelength band such as: a laser device and/or a light emitting diode (LED). Each optical fiber 1300a, 1300b, 1300c or 1300d, may be configured for directing light according to specific properties of the light outputted by the respective light source 1200a, 1200b, 1200c or 1200d to which it connects, such as for a specific narrow wavelength band or a specific wavelength, and/or specific light source output power, as well as according to specific gain purposes etc. The optical fibers 1300a-1300d may each be a doped fiber, optionally having double cladding.

Each optical fiber 1300a, 1300b, 1300c or 1300d may be fixedly connected, at its respective output end 1302a, 1302b, 1302c, or 1302d, to the input surface 1111A of the monolithic body 1110 defining thereby respective engagement spots 1101a, 1101b, 1101c or 1101d, defined as the volume, area or point of (fixed) engagement between the optical fiber's output end and the input surface 1111A. Each optical fiber 1300a, 1300b, 1300c or 1300d may be fixedly connected to the input surface 111A of the monolithic body 1110 by way of, for example, splicing, welding, gluing, fusion, and/or via an optical connector or node.

The OE 1120 may be designed and positioned such as to combine the beams exiting the output surface 1111B of the monolithic body 1110 (herein also "exiting beams") and output a combined beam 1500 that may be a power-scaled beam that maintains the original narrow/single wavelength band of all entering beams.

The OE 1120 may include a phase mask configured for manipulating or shaping beams of light e.g. by inducing localized phase changes. The OE 1120 may include a phase mask 1121 having a phase pattern configured for CBC, e.g. by causing a reverse beam diffraction. One example, for an OE 1120 phase mask 1121 design that can be used for CBC, is one that acts as a reversed beam splitter.

A beam splitter is a diffraction OE that includes a phase mask configured to split a single incident beam into several beams at equal separation angles from one another, the number of beams N resulting from the beam splitting, is defined as the "order" of the beam splitter. Placing a beam splitter OE 1120 in a reversed directionality may be used for beam combining.

According to some embodiments, the structure of a beam splitter OE 1120 may be made from an optical substrate (usually glass e.g. fused silica glass) over which a periodic phase pattern may be etched. The surface of the phase mask can be reflective or clear and the combining effect of the OE 1120 may be achieved by causing the beams to pass therethrough or reflected therefrom. The phase pattern may be periodic, where the number of beams N inputted into the OE 1120 (which is the splitting order) and/or the separation angle, may determine the design of the periodic pattern of the OE's 1120 phase mask 1121.

Figure 3A:
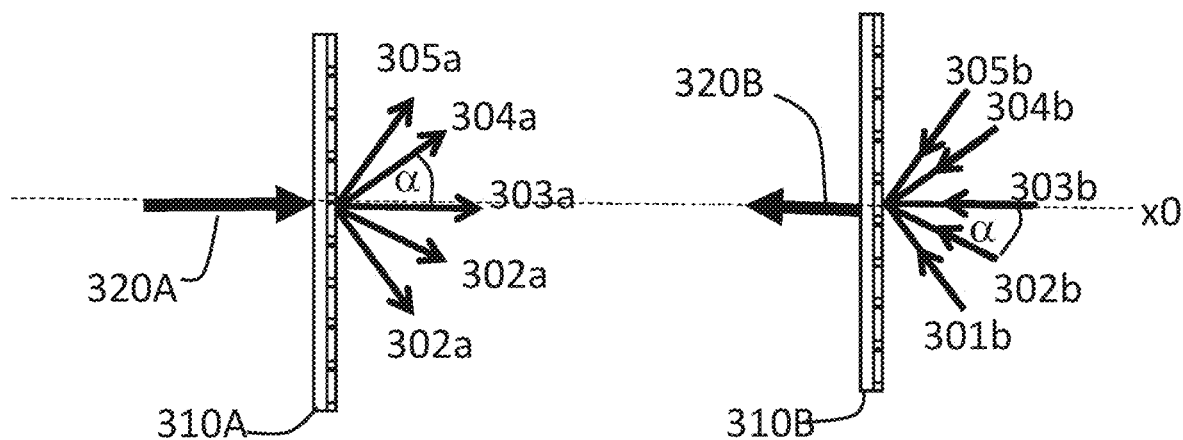
FIG. 3A shows a diagram illustrating a general optical effect of a beam splitter for illustrating how a beam splitter can be used as a diffraction optical element, according to some embodiments.

FIG. 3A shows an exemplary manner, in which a beam splitter can be reversed for serving as a beam combiner. On the left side, an incoming optical beam 320A is directed towards a beam splitter 310A, designed to split the incoming optical beam 320A into multiple output optical beams 301a, 302a, 303a, 304a and 305a. The output optical beams 301a, 302a, 303a, 304a and 305a are separated from one another at equal separation angles α (alpha). Using a beam splitter element 310B having the same phase mask pattern and design as the beam splitter 310A and inputting multiple input beams 301b, 302b, 303b, 304b and 305b spaced in the same separation angle α (alpha) and having beam properties such as wavelength as the output beams a (alpha), the beam splitter element 310B will combine the input beams 301b, 302b, 303b, 304b and 305b into a single combined output beam 320B, which may maintain the same wavelength(s) of the incoming input beams 301b, 302b, 303b, 304b and 305b.

Figure 3B:
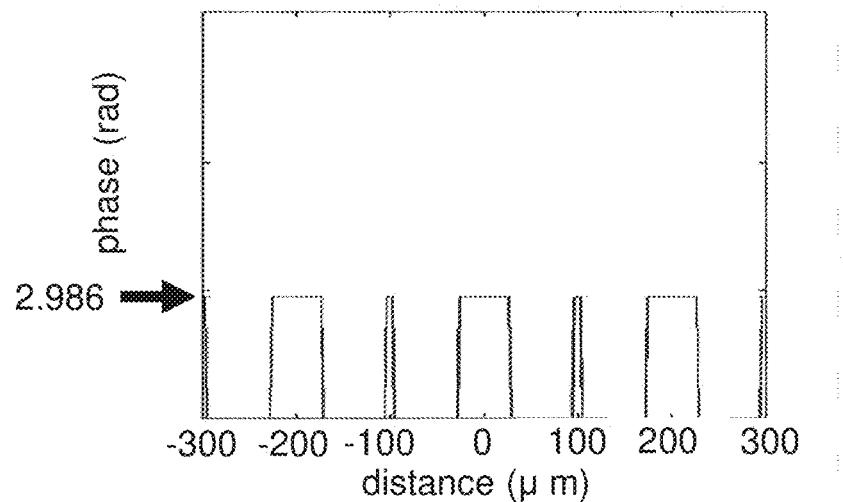
FIG. 3B shows a diagram illustrating a cross section etching pattern of a phase mask of an exemplary beam splitter.
Figure 3C:
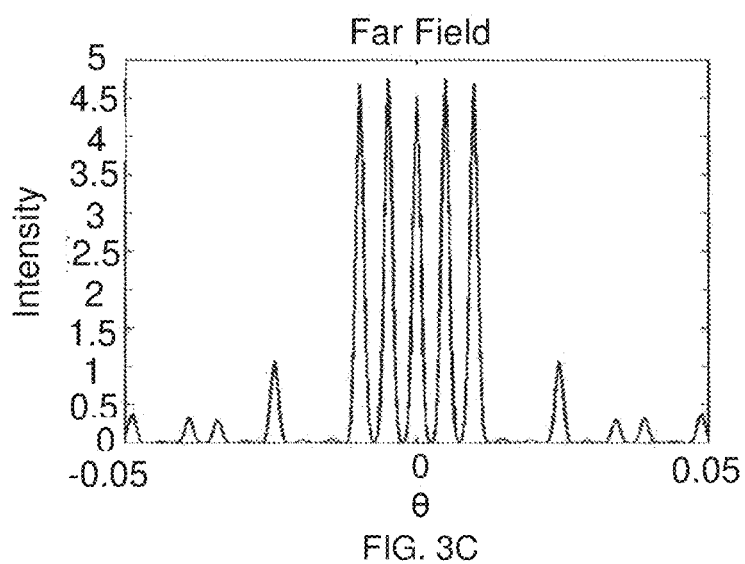
FIG. 3C shows high order side lobes of beams split by the beam splitter, according to the phase mask given in FIG. 3B.

FIG. 3B shows an exemplary diagram for a beam splitter phase mask cross sectional pattern. The relative thicknesses and depts of the etchings create over one of the sides of the OE includes a repetitive phase mask which determines how the beam will diffract when exiting the mask. In this case it will split into 5 main beams, and several high order beams-side lobes, that can be seen on FIG. 3C. The efficiency of the OE may be determined by the power in the main orders divided by the total power. The separation angle between the output beams (the peaks in the graph) may be determined by the properties of the period in the phase mask (e.g. spacing between peaks). In this example the period length is 200 ? m (micrometer) and the resultant separation angle is 0.005 Rad. Decreasing the period length will increase the separation angle and vice versa.

In coherent beam combining, the beam splitter OE may be reversed by combining N beams separated in equal separation angles into a single combined output beam. The effect can be achieved by reversing the effect of the diffraction OE and replicating the N beams in the exact separation angles that correspond to the specific OE phase mask design only in reverse directions so that they are incident on the OE instead of emerging out of it (as illustrated in FIG. 3A).

Figure 4:
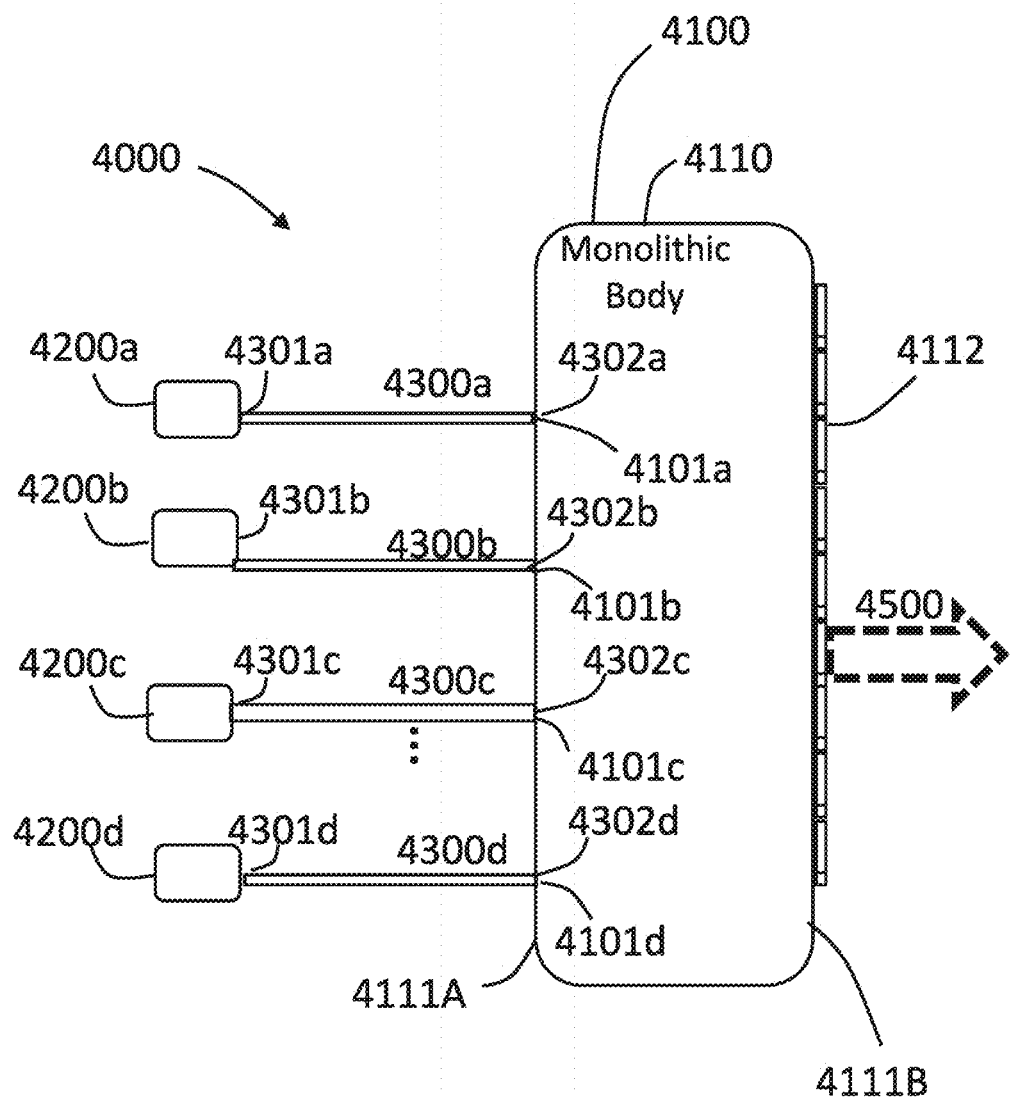
FIG. 4 shows a general layout of a coherent beam combining system for combining multiple optical beams emanating from multiple optical fibers that includes a monolithic body having a phase mask embedded over an output surface thereof, according to some embodiments.

FIG. 4 shows a general layout of a CBC system 4000 for combining multiple optical beams, according to some embodiments. The CBC system 4000 may include: multiple light sources such as light sources 4200a, 4200b, 4200c and 4200d; multiple optical fibers such as optical fibers 4300a, 4300b, 4300c and 4300d; and a beam combining device 4100 that includes a monolithic body 4110 having a phase mask 4112 embedded or integrally connected to an output surface 4111B thereof.

According to some embodiments, each optical fiber 4300a, 4300b, 4300c or 4300d may direct light originating from a respective light source 4200a, 4200b, 4200c or 4200d e.g. by having an input end of input ends 4301a, 4301b, 4301c, and 4301d of each of the optical fibers 4300a, 4300b, 4300c, and 4300d connecting to the outputs of their respective light source 4200a, 4200b, 4200c or 4200d. For example, optical fiber 4300a may direct light originating from light source 4200a etc.

Each of the light sources 4200a-4200d used, may include at least one light emitting device, configured for emitting light of the same, overlapping or a single wavelength or wavelength band such as: a laser device and/or a light emitting diode (LED). Each optical fiber 4300a, 4300b, 4300c or 4300d, may be configured for directing light according to specific properties of the light outputted by the respective light source 4200a/4200b/4200c/4200d to which it connects, such as for a specific narrow wavelength band or a specific wavelength, and/or specific light source output power, as well as according to specific gain purposes etc. The optical fibers 4300a-4300d may each be a doped fiber, optionally having double cladding.

Each optical fiber 4300a, 4300b, 4300c or 4300d may be fixedly connected, at its respective output end 4302a, 4302b, 4302c, or 4302d, to the input surface 4111A of the monolithic body 4110 defining thereby respective engagement spots 4101a, 4101b, 4101c or 4101d, defined as the volume, area or point of (fixed) engagement between the optical fiber's output end and the input surface 4111A. Each optical fiber 4300a, 4300b, 4300c or 4300d may be fixedly connected to the input surface 4111A of the monolithic body 4110 by way of, for example, splicing, welding, gluing, fusion, and/or via an optical connector or node.

According to some embodiments, the optical fibers 4300a, 4300b, 4300c and 4300d may be connected to the output surface 4111B of the monolithic body 4110 e.g. by way of slicing, fusion, welding adhering etc. and may be an integral part of the beam combining device 4100.

According to some embodiments, the monolithic body 4110 may be configured to direct the entering beams, entering therein via its input surface 4111A towards the output surface 4111B such that the exiting beams reach the phase mask 4112 at an equal and specific exit separation angle corresponding to the design of the phase mask and optionally also at a specific exit angle in respect to a main axis.

According to some embodiments, the phase mask 4112 may be engraved, etched or embossed over the output surface 4111B of the monolithic body 4110 and may be designed for CBC.

For example, the phase mask 4112 may be designed as a phase mask e.g. a diffraction grating mask for combining the exiting beams, passed through the phase mask 4112, into a single coherent output combined beam 4500 of a scaled-up power and high output beam quality.

Figure 5:
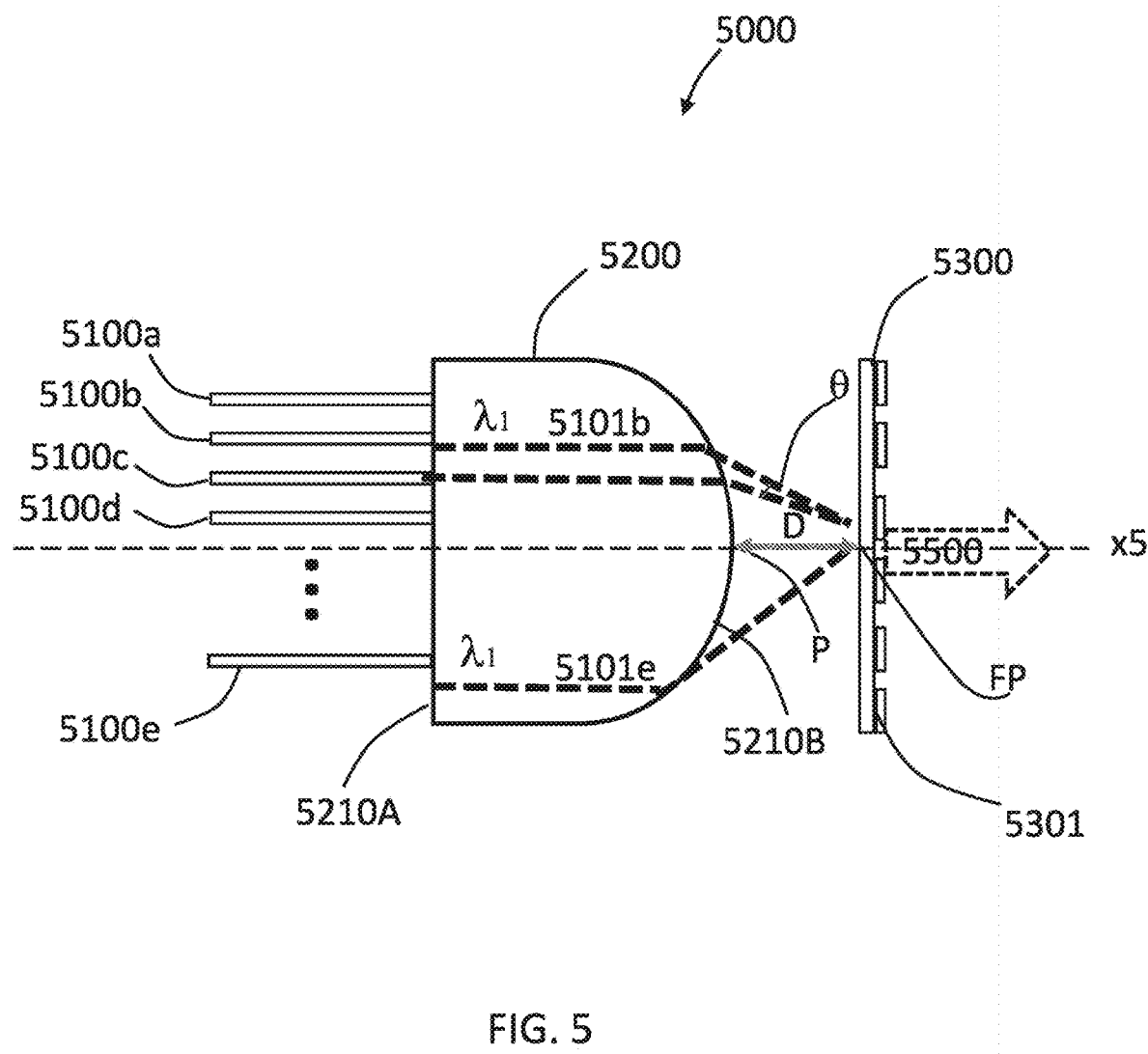
FIG. 5 shows a coherent beam combining system using a monolithic body with a lens-shaped output surface and a separated (non-coupled) optical element, according to some embodiments.

Reference is made to FIG. 5 showing a beam combining device 5000 having a monolithic body 5200 with a collimator design and a separate and external OE 5300 having a phase mask embedded therein, according to some embodiments. The beam combing device 5000 may also include a multiplicity of optical fibers such as optical fibers 5100a, 5100b, 5100c, 5100d and 5100e fixedly connected, at output ends thereof, to a flattened input surface 5210A of the monolithic body 5200.

Each of the optical fibers 5100a, 5100b, 5100c and 5100d may be configured to guide light originating from one or more light sources and output the guided light from output ends thereof, which connect to the input surface 5210A of the monolithic body 5200. The beams outputted from the output ends of the optical fibers 5100a, 5100b, 5100c and 5100d may be set to enter the monolithic body 5200 (and therefore are referred to as the "entering beams"), from the flattened or straight input surface 5210A thereof, at equal spacing and equal separation angles, which in this configuration is a zero angle, in respect to a main axis x5 as they are parallel to one another.

The monolithic body 5200 may be fully transparent and may have an output surface 5210B that is curved to form a lens like collimator design for collimating the entering beams, entering at a zero entrance angle in respect to the main axis x5, into a focal point FP, located over the main axis x5 and in a focal plane that is substantially perpendicular to the main axis x5 and distant from it at distance D, where D is defined as the focal distance. The OE 5300 may be located over that focal plane and the focal distance D from the collimation peak P of the output surface 5210B of the monolithic body 5200 where D may be defined as the focal length. As seen in FIG. 5, the flattened input surface 5210A may also be perpendicular to the main axis x5 for enabling the entering beams to enter in parallel to one another and to the main axis x5.

The OE 5300 may include a phase mask 5301 e.g. etched, embossed or adhered thereto, configured to combine exiting beams, that exit the output surface 5210B of the monolithic body 5200 for outputting a combined output beam 5500, optionally directed along the main axis x5.

The OE 5300 may be a diffraction grating such as a beam splitter having an etched, embossed or adhered phase mask corresponding to entering and/or exiting beams properties such as wavelength, phase, intensity etc. as well as to the design, dimensions and/or properties of the collimator monolithic body such as focusing properties, focal length etc. The phase mask design may also depend on the separation angles θ (theta) of the optical beams exiting and/or entering the monolithic body 5200 from the output and/or input surfaces 5210B/5210A thereof.

Figure 6:
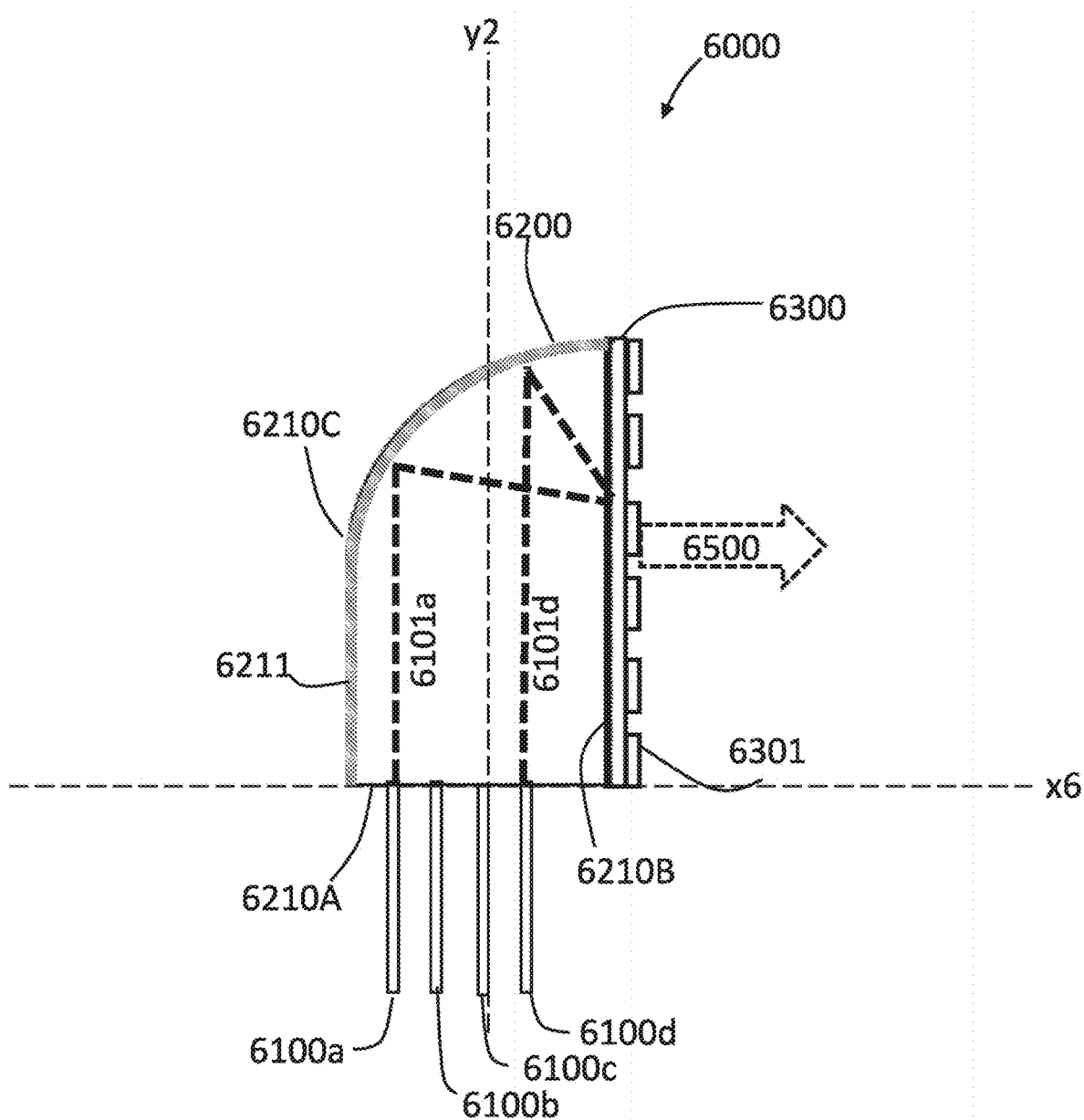
FIG. 6 shows a coherent beam combining system using a monolithic body with an inner reflective surface and a phase mask that is etched, embossed or adhered over an output surface thereof, according to some embodiments.

Reference is now made to FIG. 6, showing a beam combining device 6000 having multiple optical fibers 6100a, 6100b, 6100c and 6100d (connectable to one or more light sources for outputting coherent entering beams); and a monolithic body 6200 with three surfaces, according to other embodiments.

The monolithic body 6200 may have three surfaces: a flattened input surface 6210A fixedly connectable to the optical fibers 6100a, 6100b, 6100c and 6100d; a flattened output surface 6210B having a phase mask 6301 embedded therein or connecting thereto via an OE 6300, and an additional third surface 6210C, located between the input surface 6210A and the output surface 6210B.

The third surface 6210C may be curved and reflective e.g. by having a reflective layer 6211 coated or attached at an inner or outer side thereof, for directing the entering beams parallelly entering the monolithic body 6200 from the input surface 6210A thereof, towards the output surface 6210B by way of reflecting the entering beams such that the separation angles between each adjacent exiting beams will match the design and positioning of the phase mask 6301 of the OE 6300.

According to some embodiments, the phase mask 6301 of the OE 6300 may include a diffraction grating phase mask or any other mask profile design that enables combining the exiting beams into a coherent power scaled combined output optical beam 6500.

The geometry of the monolithic body 6200 and the relative positioning of its input surface 6210A, third surface 6210C and output surface 6210B and the curving shape of the third surface 6210C may be such that entering beams such as beams 6101a or 6101d, respectively emanating from optical fibers 6100a and 6100d, entering from the input surface 6210A are converged/focused into a focal point located at the output surface 6210B, where the phase mask 6301 is also located.

According to some embodiments, the input surface 6210A may be flattened defining an axis x6 to which the flattened output surface 6210B may be perpendicular (i.e. the input surface 6210A being perpendicular to the output surface 6210 and may be engaging therewith through an engagement axis also perpendicular to axis x6), where the curving of the (reflective) third surface 6210C and the design and positioning of the phase mask 6301 may be such that the combined output optical beam 6500 is outputted in parallel to the x6 axis direction.

Figure 7:
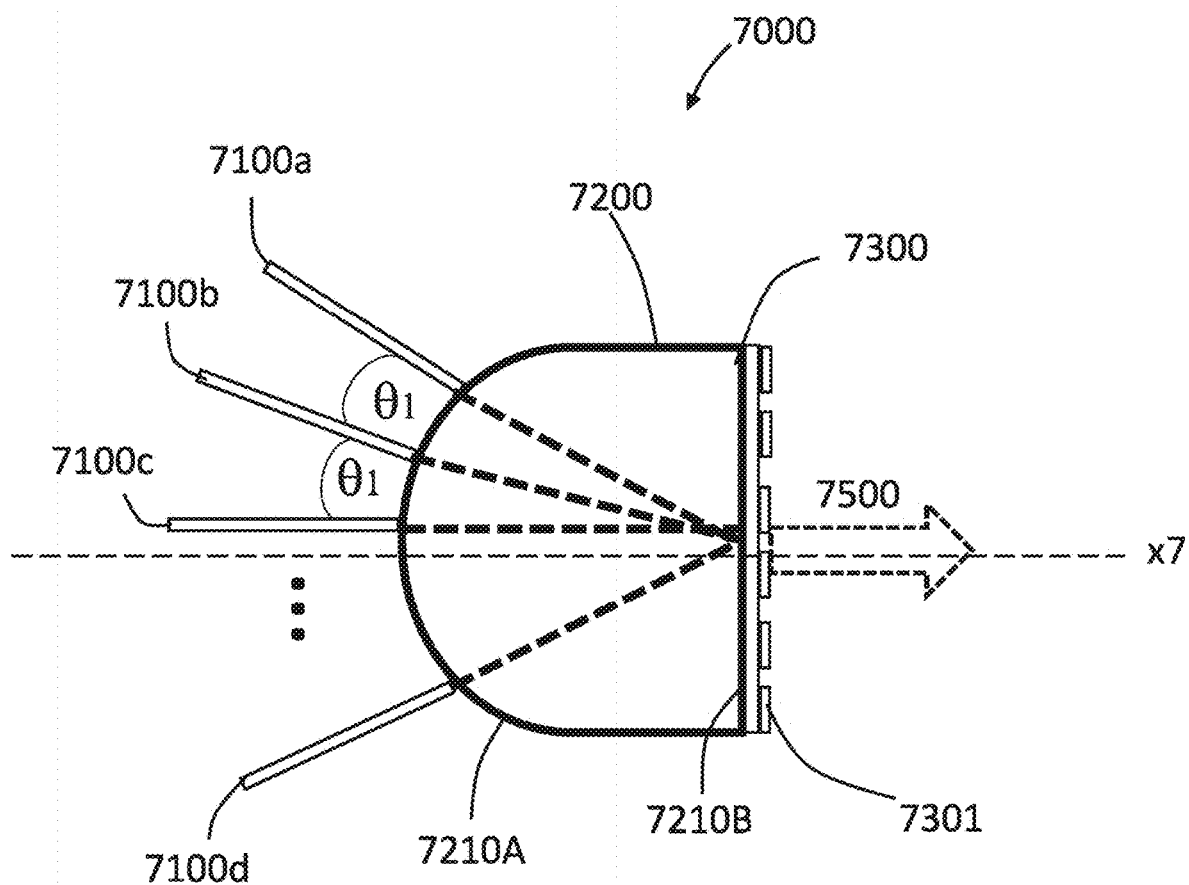
FIG. 7 shows a coherent beam combining system using a monolithic body with a curved input surface and a phase mask that is etched, embossed or adhered over an output surface thereof, according to some embodiments.

Reference is now made to FIG. 7, showing a beam combining device 7000 having multiple optical fibers 7100a, 7100b, 7100c and 7100d (connectable to one or more light sources for outputting coherent entering beams); and a semi-sphered or lens-shaped monolithic body 7200 having a curved input surface 7210A and a flattened output surface 7210B.

The output surface 7210B of the monolithic body 7200 may be integrally connected to an OE 7300 or having a phase mask 7301 embedded thereover such that the exiting beams reach the output surface 7210B at a specific equal exit separation angle θ1 (theta 1), which should match the design of the phase mask 7301. The specific value of an exit separation angle equal for all exiting beams may be achieved by having the optical fibers 7100a, 7100b, 7100c and 7100d connect to the curved input surface 7210A at equal spacings from one another and optionally configuring the curved input surface 7210A such that it has a spherical or semi-spherical symmetry about a main axis x7, so that the entry separation angle θ1 (theta 1) between the entering beams is the same for all entering beams and/or focusing all entering beams into a single focal point located over the main axis x7. In this configuration, the light outputted by the optical fibers 7100a, 7100b, 7100c and 7100d is angularly directed towards the flattened output surface 7210B to focus the entering beams into a single focal point located over the output surface 7210B located over the main axis x7. The main axis x7 may be defined as an axis that is perpendicular to the output surface 7210B.

According to some embodiments, the phase mask 7301 may be designed and positioned such as to combine all exiting beams into a single combined output beam 7500 that may be propagating along the main axis x7.

Another way in which the entering beams can be collimated or focused may be achieved by using a monolithic body having varying refractive indices, such as, for example, by using a monolithic body with graded indexing (GRIN) where the gradually changing of the refractive index may create a focusing or a directing effect over the entering beams.

Figure 8:
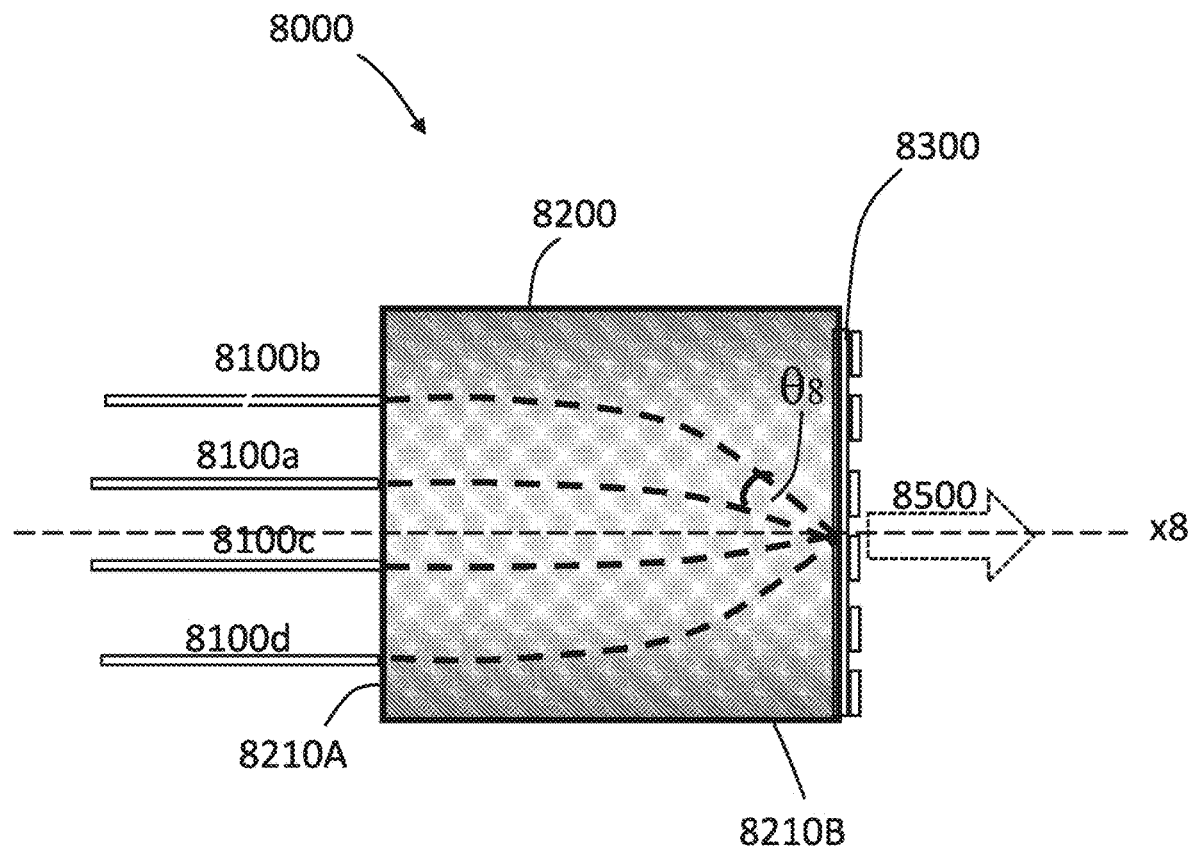
FIG. 8 shows a coherent beam combining device that includes a monolithic body having a gradually varying refractive indexing configuration, according to some embodiments.

FIG. 8 shows a beam combining device 8000 that includes: a plurality of optical fibers 8100a, 8100b, 8100c and 8100d; a monolithic body 8200 having a gradually varying refractive indexing configuration; and a separate phase mask 8300.

According to some embodiments, the monolithic body 8200 may include a gradual variation of the refractive index in the monolithic body 8200 that can create a lens-like focusing effect, for focusing the entering beams into a single focal point. For example, the monolithic body 8200 may have a cylindrical shape and be designed such that the outer cylindrical areas of the monolithic body 8200 may have lower refraction indices (indicated in darker gray color) than the inner areas (indicated in lighter gray to white coloring), such that the refractive index is gradually changed (i.e. gradually increased or reduced) towards the central cylinder axis x8 or a central plain including the axis x8, which, may also be the main axis.

The monolithic body 8200 may have a flattened input surface 8210A allowing the light from the optical fibers 8100a, 8100b, 8100c and 8100d to enter in parallel direction to one another and in relation to the main axis x8; and an output surface 8210B which may also be flattened and parallel to the input surface 8210A i.e. also perpendicular to the main axis x8, allowing thereby easier splicing of the optical fibers 8100a, 8100b, 8100c and 8100d to the input surface 8210A and attaching, etching or embossing of the phase mask 8300 onto the output surface 8210B of the monolithic body 8200.

According to some embodiments, as shown in FIG. 8, the phase mask 8300 may be implemented as a diffraction grating mask etched or embossed over the output surface 8210B in case the focal point is located over the output surface 8210B.

Alternatively, the phase mask 8300 may be implemented as a separate diffraction optical element (DOE) attached to the output surface 8210B in case the focal point of the entering beams is located over the output surface 8210B or externally located therefrom, in case the focal point is located externally from the monolithic body 8200.

The phase mask 8300 may be positioned in parallel to the input and output surfaces 8210A and 8210B and (therefore) perpendicularly to the main axis x8, ultimately for having the exit beams focused at a plane over which the phase mask 8300 is located, at equal and specific separation angles θ8 (theta 8), corresponding to the mask profile design, for allowing combining the exiting beams into a single coherent combined output beam 8500, optionally propagating along the main axis x8.

The gradually varying refractive indexing configuration of the monolithic body described in FIG. 8 illustrates embodiments in which the beams passed through the monolithic body, converge into a focal point or area, due to the indexing changes, that is located over the OE's phase mask, which is external to the monolithic body. Other configurations may be such that the curving of the beams passed through the monolithic body converge them to a focal point or area that is located over the phase mask which may be coupled to or positioned over the output surface of the monolithic body.

Embodiments or components of embodiments of the systems and methods described herein, such as the monolithic bodies 1110, 4110, 5200, 6200, 7200, 8200 and/or OEs 1120, 5300, 7300 and/or phase masks 1121, 4112, 5301, 6301, 7301, 8300, may be shown in the drawings in two-dimensions (2D) configuration, while referring to components that may be of 3D, for illustration purposes only.

Embodiments provided herein may also include systems using multiple coherent beam combining devices (also referred to herein as CBC devices) in a network configuration such as to provide enhanced power scaling by using additive optical signal amplification, e.g. by using one or more additional CBC devices and/or spectral beam combining (SBC) devices.

For example, such a system may include a first set of CBC devices, each using multiple optical waveguides such as optical fibers fixedly connected to its respective input surface and each outputting an amplified coherent and combined output optical beam. The combined output optical beam of each CBC device may then be guided/directed as an entering optical beam towards another beam combining device such as a CBC or SBC device through its respective input surface, where the additional beam combining device may be configured to cause another amplification of all the coherent combined beams from several other such beam combining devices. The guiding or directing of the coherent and combined output optical beams may be done using optical waveguides connecting to the output surface of each of the CBC devices or by positioning the additional beam combining device such that the optical beams reach its input surface through the air (unguided).

The configuration may be repeated by having multiple CBC devices' output beams used as input beams of other one or more CBC device having the same or different configuration, such as to form any kind of CBC devices network (herein "reticulated CBC system"), depending on CBC devices' material properties limitations (e.g. maintaining rigidity in high temperatures caused due to high power beams directed thereby) and losses that may be formed.

Figure 9:
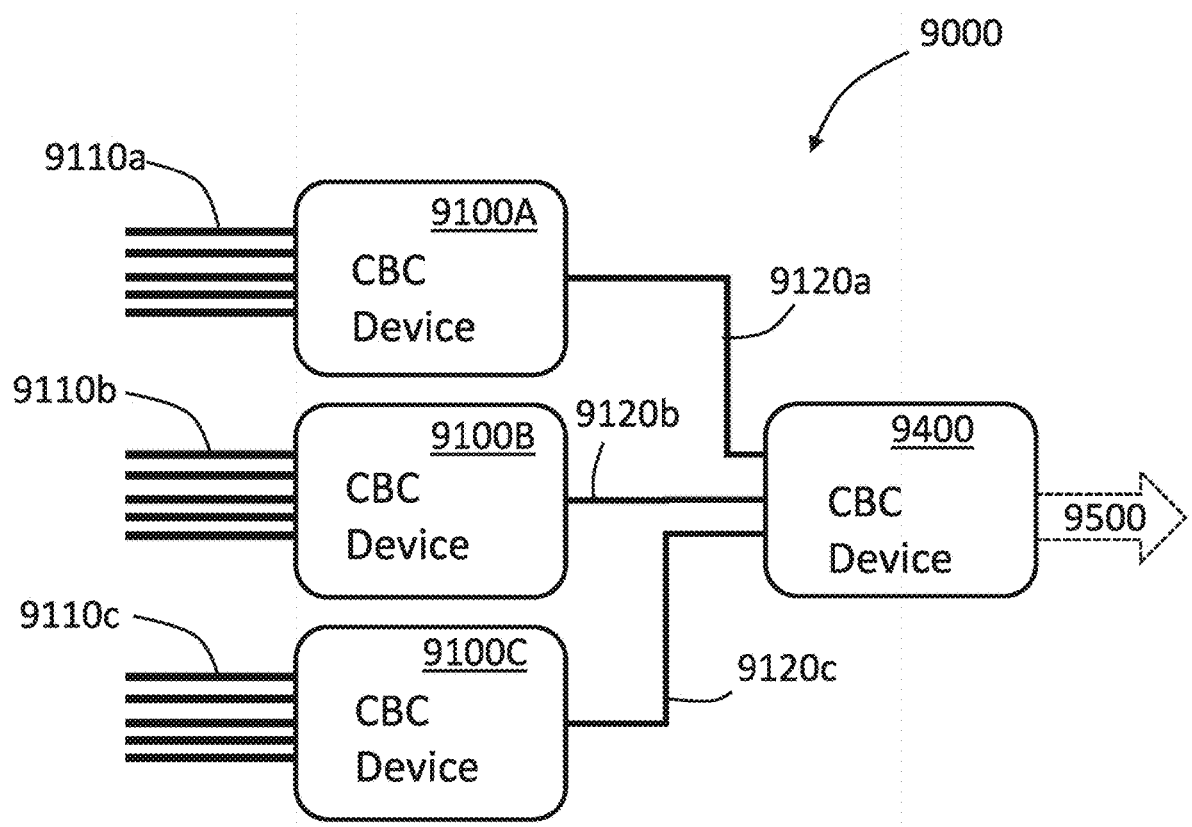
FIG. 9 shows a system for coherent beam combining having multiple beam combing devices, according to some embodiments.

FIG. 9 shows a CBC system 9000 by reticulating multiple beam combining devices, according to some embodiments. The CBC system 9000 includes multiple input CBC devices such as input CBC devices 9100A, 9100B and 9100C; and an additional CBC device 9400. According to some embodiments, each of the input CBC devices 9100A, 9100B and 9100C has and/or fixedly connects to a set of multiple input optical fibers such as fiber sets 9110a, 9110b and 9110c, respectively and outputs a coherent, combined output beam that may be guided via its respective optical waveguide 9120a, 9120b and 9120c towards an input surface of the additional CBC device 9400.

Each of the CBC devices 9100A, 9100B and 9100C may include a monolithic body and a phase mask, according to one of the configurations described above. The monolithic body of each of the CBC devices 9100A, 9100B and 9100C may be configured to focus the entering beams, emanating from the optical fibers of the respective CBC device, to a focal point located over a focal plane, over which the phase mask is located. The phase mask may be located over an output surface of the respective monolithic body (e.g. in which case the output surface may have the phase mask etched, embossed or attached/coupled thereto and may be therefore flattened), or located externally from the monolithic body (in which case—the phase mask may be implemented in a separate OE such as a DOE).

The CBC devices 9100A, 9100B and 9100C may be similar, identical or different in configuration from one another, e.g. in type, chemical composition, wavelength and/or number of entering beams, size, geometry, number and/or configuration of optical fibers connected thereto etc., depending on system requirements.

Each of the optical waveguides 9120a, 9120b and 9120c may be designed and positioned in respect to the output surface of the monolithic body of its respective CBC device, such as to be able to sustain the high output power of the combined output beam and guide thereof therethrough in a coherent and collimated manner for avoiding losses in power and/or coherency. The additional CBC device 9400 may be configured to focus the entering beams emanating from the waveguides 9120a, 9120b and 9120c and combine thereof by having a monolithic body configured to focus the entering beams into a focal point located over a focal plane, and using a phase mask (not shown), located over the focal plane, for causing a CBC of the entering beams, outputting a coherent final output beam 9500 that may be significantly additively amplified.

Embodiments of the reticulated CBC system may be designed to any branching/network configuration, e.g. using multiple additional CBC devices, where the output beams thereof serve as the entering beams to yet additional CBC devices.

The phase mask of one or more of the above-described embodiments may be configured as a diffractive grating mask such as a beam splitter used in a reversed manner for beam combining. The diffractive grating mask may be implemented as an etching or embossment over a surface (e.g. the output surface of the monolithic body of the beam combining device or over a surface of a separate element). According to some embodiments, the diffraction grating phase mask may be implemented as an immersed diffraction grating mask (e.g. by having the grating immersed in a material of a higher refraction index) for having also the external side of the phase mask flattened and/or for improving output beam quality. A flat and planar output surface of the phase mask may be required, for instance, for allowing use thereof for CBC devices of the reticulated CBC systems, for example, for allowing fixedly attaching the waveguides thereof to a flat output surface of the phase mask of the CBC devices.

According to some embodiments, the phase mask may be made from a transparent or at least partially transparent material.

Spectral beam combining (SBC) may be used for power scaling of fiber lasers to extremely high output powers, e.g., more than 2000 watts of output power, by combining laser beams of different wavelengths and requiring modest bandwidth and wavelength control of the individual sources.

The general principle of SBC is to combine several entering beams of non-overlapping optical spectra using some kind of wavelength-sensitive beam combiner. such as a prism or an optical diffraction grating element, which can deflect incident beams according to their wavelengths.

Combining multiple beams of non-overlapping spectra may be done by directing all beams onto a phase mask such as an optical grating, each beam being directed towards the phase mask at a slightly different angle so that all beams exit the phase mask in the same angle.

Assuming each beam is monochromatic, its ideal relative angle to the optical grating plane (ideal beam combining) may be related to its respective wavelength according to the following mathematical relation:

$$\theta_i \propto g\lambda_i \qquad (1)$$

Where g represents the grating density and $\lambda_i$ represents the wavelength of the respective incident beam.

Figure 10A:
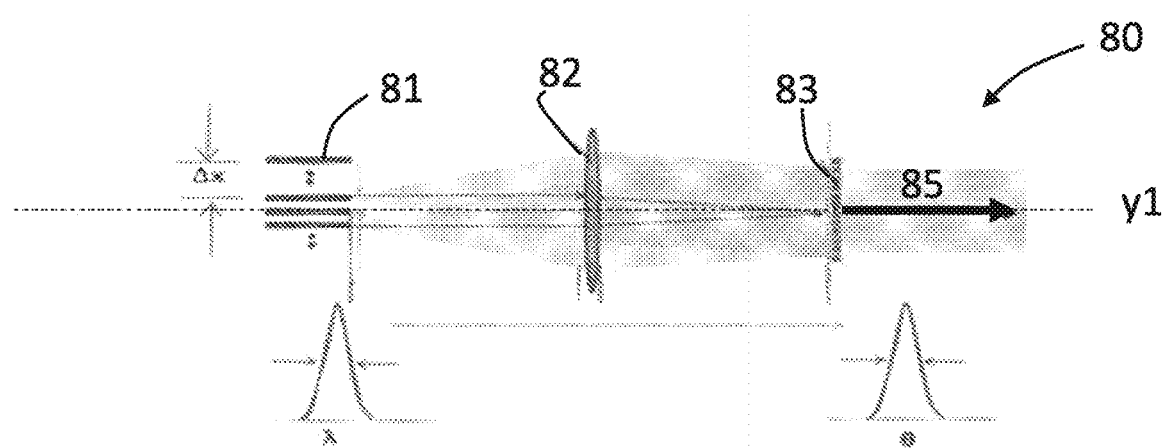
FIG. 10A shows a background art optical setup for spectral beam combining, using a single diffraction grating element.

FIG. 10A (Background Art) is a schematic illustration of an SBC optical setup 80 based on a single-diffraction scheme. The SBC optical setup 80 includes a linear array of lasers outputting parallel optical beams 81, a focusing lens 82, and a diffraction grating optical element 83.

As shown in FIG. 10A, the parallel entering optical beams 81 are directed to the focusing lens-82, where the focusing lens 82 focuses and directs the beams to diffraction grating optical element 83, which diffracts the beams into a common exit angle and multiplexes the beams into a single combined output optical beam 85. In this configuration, since each beam is of a different wavelength and due to the focusing of the entering optical beams 81, each optical beams impinges the diffraction grating optical element 83 at a different angle allowing the diffraction grating optical element 83 to divert each beam towards the same output direction (along axis y0). Since all elements of the optical setup 80 are spaced from one another, maintaining alignment and stability is difficult especially for a long period of time.

In practice, the ability to combine a large number of optical beams covering a broad wavelength band and maintain a high-quality beam is also limited when using such an optical setup 80 as shown in FIG. 10A. The need to impinge the diffraction grating optical element 83 at different angles, i.e., a different angle for each laser wavelength, allows the use of a common focusing lens 82 only for specific wavelengths equal intervals between adjacent optical beams. This implies that for a small wavelength interval $\Delta\lambda$ between channels, a small angular interval $\Delta\theta$ is required so that for a finite fiber pitch the lens focal length could be prohibitive for certain applications.

In addition, in order to avoid non-linear phenomena in a high-power fiber laser, a finite spectral bandwidth SA is required, thus, the use of diffraction grating optical element 83 may cause degradation in output optical beam quality according to the following relation:

$$\delta\theta \propto g\delta\lambda \qquad (2)$$

where $\delta\theta$ is the angle broadening of the diffracted beam, g is the grating density of lines and $\delta\lambda$ is the wavelength broadening of the respective laser optical beam.

According to equation (2) the divergence of a beam having a finite spectral width $\delta\lambda$ is degrading (broadening of divergence angle) by a factor proportional to that spectral width $\delta\lambda$, where this factor is determined by the optical properties of the respective diffraction grating optical element 83.

The use of narrow band laser beams (typically less than 10 GHz) with a single diffraction grating limits the maximal power of the laser beams mainly due to Stimulated Brillouin Scattering (SBS), when used in fiber laser amplification, characterized by a strong reflection back into the lasers. The SBS setup 80 power threshold is proportional to the fiber length (L), the band width ($\Delta\nu$) and inversely proportional to the core diameter (A):

$$P_{th} \propto \frac{L * \Delta v}{A}.$$

Enlarging the core diameter deteriorates the beam quality (higher optical modes are easily excited in fibers having large core diameters), and on the other hand enlarging the bandwidth damages the combined beam divergence; these two parameters limit the total power and quality of the output optical beam.

It should be noted that high power fiber lasers which require a large number of channels may limit the beam quality by a magnitude of $M^2$.

Also, for an efficient SBC, the alignment of the beam position and the angle at which each of the optical gratings is impinged has to be very accurate and must be kept so during the whole procedure.

Figure 10B:
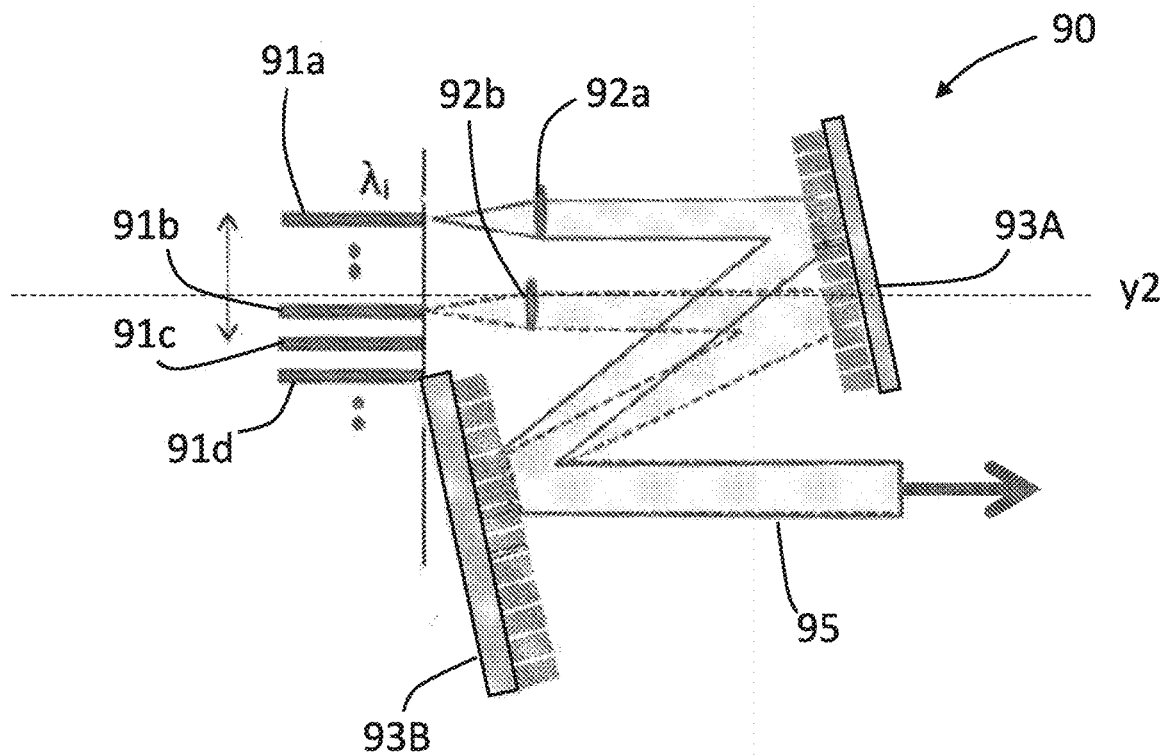
FIG. 10B shows a background art optical setup for spectral beam combining, using two diffraction grating elements.

FIG. 10B (background art) is a schematic illustration of a SBC optical setup 90, which includes: two identical diffraction grating elements (DGEs): a first DGE 93A and a second DGE 93B; multiple light sources 91a, 91b, 91c, and 91d outputting multiple parallel entering optical beams each having a slightly different wavelength; and multiple focusing lenses (each for every light source) such as lenses 92a and 92b.

As shown in FIG. 10B, the lenses 92a and 92b are positioning such that their respective light source's output point is the focal point of the respective lens, so as to direct a respective optical beam of a substantially maintained equal diameter (with low beam divergence) towards the first DGE 93A. The beams passed through the lenses, impinge the first DGE 93A at parallel trajectories to one another and to axis y2, and are deflected from the first DGE 93A at non-parallel trajectories to one another and to axis y2, due to the differences in their wavelengths. The optical beams deflected from the first DGE 93A are directed towards and imping the second DGE 93B, which combines them by deflecting them towards the same direction in parallel to one another and to axis y2 for outputting a combined multispectral output optical beam 95. This configuration requires the two DGEs 93A and 93B to be positioned in parallel to one another in angularly in respect to the trajectories of the entering beams and to y2.

Aspects of disclosed embodiments pertain to beam combining devices each having a monolithic body configured for SBC of multiple spectrally differentiated optical beams emanating from a plurality of light sources such as from output ends of multiple optical fibers fixedly connected or connectable to the, where the beam combining devices are configured for SBC of the optical beams. The monolithic body may include at least: an input surface, a diffractive surface and an output surface.

According to some embodiments, the monolithic body may be configured to direct the entering optical beams, entering via the input surface of the monolithic body, through a multi-diffraction optical pathway inside the monolithic body, e.g. by directing the entering optical beams such as to impinge the diffractive surface at least twice, for combining the entering optical beams into a single combined multispectral combined output optical beam, exiting the monolithic body via the output surface. The multi-diffraction pathway that the entering optical beams are directed through may be enabled, using a single diffractive surface, by causing the entering optical beams to be internally reflected by the monolithic body e.g. by using one or more reflective surfaces in the monolithic body or by configuring at least part of the monolithic body for total internal reflection (TIR) or partial internal reflection (PIR).

According to some embodiments, the configuration of the monolithic body e.g. the geometry, dimensions, elements and/or material(s) thereof, may be designed in accordance with the properties and/or positioning of each of the entering optical beams such as the location in which each optical fiber is connected over the input surface (defining the entrance point of the specific entering beam and its entry trajectory), the wavelengths or wavelength bands of the specific entering optical beams etc. The input, output and/or diffractive surfaces of the monolithic body may be planar (flat) for enabling easy connection of the fiber's ends to the input surface (e.g. by splicing, welding, etc.) and for enabling the multi-diffraction optical pathway of the entering optical beams inside the monolithic body. Other embodiments may include curved configuration of one or more of these surfaces.

According to some embodiments the diffractive surface may include one or more phase masks, configured for diffracting each impinging beam e.g. by deflecting thereof according to its respective wavelength. Non-limiting examples for such phase masks may include: diffraction grating masks, prisms, etc. The phase mask(s) may be etched, embossed or attached to the diffractive surface. The phase mask(s) may be embedded in a separate optical element attached to one side of the monolithic body, thereby forming the monolithic surface thereof.

According to some embodiments, each entering optical beam may enter the monolithic body, through the input surface thereof, at the same entrance angle, i.e. in parallel to one another, and may be directed inside the monolithic body towards the phase mask for being deflected thereby through a first deflection. The deflected optical beams will each have a trajectory of a different direction, since they entered parallelly to one another and since they are of different wavelengths. The monolithic body may be configured to have the optical beams, first deflected from phase mask of the diffractive surface, be redirected again towards that same phase mask (e.g. by again deflecting thereof using reflection and/or refraction means embedded inside the monolithic body) so that the returning optical beams (now having different trajectory directions) will be combined into a single output optical beam, since the reflected optical beams now return and impinge the phase mask (again) at different trajectory directions from one another, allowing the phase mask to again deflect each optical beam at an angle that is different from its impinging one, such that after the second diffraction of the beams all optical beams exit the monolithic body (e.g. via the output surface) at the same trajectory angle (i.e. at the same propagation direction) forming the combined output optical beam.

According to some embodiments, the monolithic body may be at least mostly made from a transparent material such as glass, fiberglass etc. and may be of a uniform single refractive index or changing refractive index.

According to some embodiments, the beam combing device may be defined as including the monolithic body as well as the optical fibers fixedly connected thereto.

Figure 11:
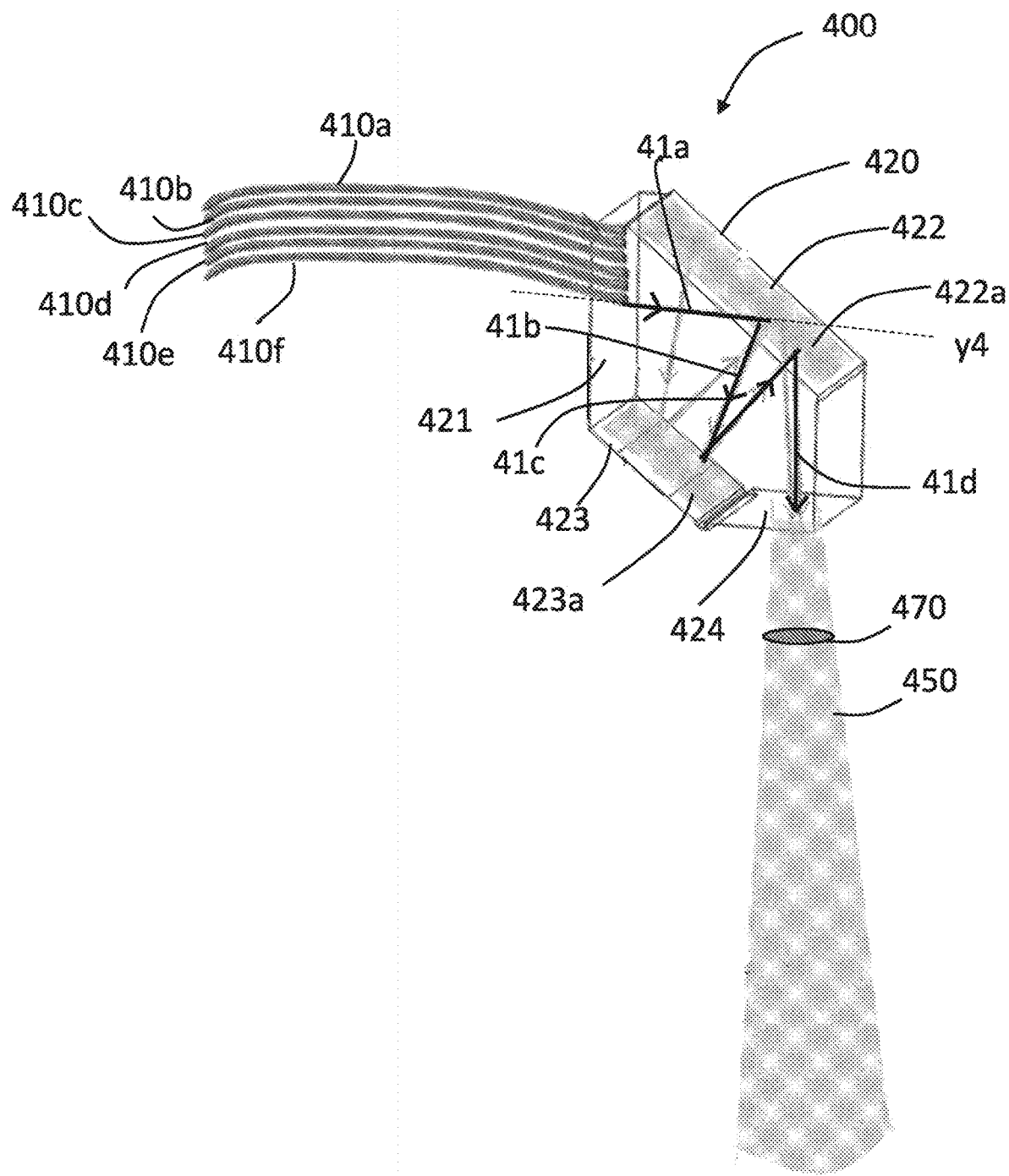
FIG. 11 shows a spectral beam combining device, using a monolithic body with a single diffractive surface and a reflective surface parallel thereto, according to some embodiments.

FIG. 11 is a schematic illustration of an SBC device 400, according to some embodiments. The SBC device 400 may include: a plurality of optical fibers 410a, 410b, 410c, 410d, 410e and 410f; and a monolithic body 420. The monolithic body 420 may be a single monolithic 3D element or object having: a flat input surface 421 fixedly connected to output ends of the plurality of optical fibers 410a-410f; a flat diffractive surface 422 having a phase mask 422a such as a diffraction grating mask etched or embosses thereover, or attached/coupled thereto; a reflective surface 423 being at least partially reflective; and an output surface 424 from which the combined output optical beam 450 exits.

According to some embodiments, the monolithic body 420 may be at least mostly made from a transparent material such as glass, fiberglass etc. and optionally of a uniform single refractive index.

According to some embodiments, to form the reflective surface 423 of the monolithic body 420, the respective side of the monolithic body 420 may be coated with a reflective material 423a or attached to a reflective element.

According to some embodiments, as shown in FIG. 11, the input surface 421 may be a planar flat surface to which the optical fibers 410a-410f may be fixedly connected e.g. by welding, splicing and/or gluing, at an output end thereof (outputting the entering optical beams). The connection of the optical fibers 410a-410f to the input surface 421 may be such that the entering optical beams enter the monolithic body in parallel to one another defining a main axis y4 (parallel thereto). Optionally, the engagement points of connection between the input surface 421 and the output ends of the optical fibers 410a-410f may be symmetrically arranged and/or equally spaced. The input surface 421 may be polished for increasing the contact (engagement) area with the output ends of the optical fibers 410a-410f.

In accordance with some embodiments, the diffractive surface 422 and the reflective surface 423 may both be planar and substantially parallel to each other to enable a double diffraction scheme, in which each of the entering optical beams outputted by the optical fibers 410a-410f will double impinge the diffractive surface 422, by having the entering beams (entering in parallel trajectories) directed from the input surface 421 towards the diffractive surface 422, where they impinge and being deflected each in a different angular direction, from the diffractive surface 422 towards the reflective surface 423; from the reflective surface 423 towards the diffractive surface 422 (again); and from the diffractive surface 422 towards the output surface 424. In the final optical path of the optical beams, from the diffractive surface 422 towards the output surface 424, all the optical beams are parallel to one another such as to form the combined output optical beam 450 when exiting the monolithic body 420.

To better illustrate the double-diffraction optical path each beam is passed through, due to the configuration of the monolithic body and in respect to its specific wavelength, one can follow the marked optical path of the entering optical beam 41a of the optical fiber 410f (see FIG. 11): the optical beam 41a enters the monolithic body 420 through the input surface 421 thereof at a first angle parallel to the y4 axis, then impinges the phase mask 422a of the diffractive surface 422 by which it is deflected to a different trajectory 41b direction at a non-zero angle in respect to the axis y4 and directed towards the reflective surface 423 for impinging thereof. The impinging beam of trajectory 41b is reflected by the reflective surface 423 back towards the diffractive surface 422 along another trajectory 41c angular to the axis y4 and then deflected again by the diffractive surface 422 and directed towards the output surface 424 along another trajectory 41d.

As shown in FIG. 11, since all optical beams, emanating from optical fibers 410a-410f, enter the monolithic body 420 in parallel to one another, the initial trajectories thereof are parallel and directed towards the diffractive surface 422. However, due to the optical beams' different wavelengths, the angle of the second trajectories of the beams directed towards the reflective surface 423 is different from one beam to another (since the diffraction angle depends on the wavelength of the impinging beam) and therefore the optical beams are also reflected back to the diffractive surface 422 at different trajectories' angles from one another—such that each optical beam reaches the diffractive surface 422 phase mask 422a again at different trajectory angles from one another. In this way the phase mask 422a can combine the optical beams by deflecting them again all at the same trajectory angle in respect to axis y4. The second diffraction diffract the optical beams at trajectory angles necessary for uniting them into a single output optical beam.

In accordance with some embodiments, the diffractive surface 422 and the reflective surface 423 are parallel to each other and tilted with respect to the input surface 421.

As shown in FIG. 11, the monolithic body 420 may have additional surfaces, which may be flat or curved for having a 3D configuration in which the input, diffractive, reflective and output surfaces form a 3D body in which, for example, the diffractive surface 422 is parallel and opposite to the reflective surface 423 and angular to the input surface 421.

According to some embodiments, the entering beams outputted by the optical fibers 410a-410f emanate from a plurality of light sources (not shown) such as from a plurality of input laser devices or LED sources, each configured to output light of a different wavelength.

According to some embodiments, one or more external optical elements may be used, e.g. located in proximity to the output surface, for example a focusing lens 470, for preventing or decreasing divergence of the output optical beam 450 exiting the monolithic body 420.

The relation between the beam quality and the double-diffraction design parameters may be expressed as follows:

$$BQ = 1 + \frac{\Delta x \cdot \Delta \lambda}{2\omega_0 \cdot \delta \lambda} \tag{4}$$

Where: BQ is the beam quality of the output combined optical beam, $\Delta x$ is a lateral separation distance between fiber laser sources, $\delta \lambda$ is a typical source spectral bandwidth, $\Delta \lambda$ is a source wavelength separation, and $\omega_0$ is the beam waist (an output beam radius).

As seen in equation (4), the expected beam quality is proportional to $\Delta x$, the lateral separation distance between the entering optical beams' entry points and inversely proportional to the beam waist, $\omega_0$.

Unlike conventional setups where $\Delta x$ and $\omega_0$ are in the order of a few millimeters, the SBC devices disclosed herein, such as SBC device 400, the spacing between the entry points of the entering optical beams may be in the order of hundreds of microns while the beam waist, $\omega_0$, could be very large ($\Delta x$ could be in the order of 2-5 millimeters) so that corresponding beam waste $\omega_0$ would be at the range 0.5-2 milimeters.

Enabling such significant decrease in the spacing between entry points of the entering optical beams can significantly improve the quality of the output optical beam, since the best beam quality ($M^2$) can be achieved when BQ (or $M^2$)=1 ($M^2$=1 is also called a beam with "diffraction limited" divergence). Thus, the beam quality increases as the lateral distance, $\Delta x$, decreases.

According to other embodiments, the entering optical beams may be directed in free space to enter the monolithic body 420 (and not via optical fibers spliced to the input surface 421. According to some embodiments, fixedly connecting (e.g. splicing) of the optical fibers 410a-410f to the monolithic body 420 via welding, for instance, directly to a (e.g. glass) input surface 421 may eliminate the need for end caps (ECs) to seal the fiber tips since the light propagation is carried out within the glass. This way drawbacks associated with end caps are eliminated, problems such as back reflections in which light is reflected back from the tips of the end caps back into the optical fiber, causing power losses, therefore the solution provided herein can dramatically reduce losses and increase output power.

Attaching (e.g. splicing) of the optical fibers directly to the input surface can eliminate the need to use endcaps for sealing the fiber tips, thus enabling reduction of the spacing between the optical fibers resulting in a highly compact configuration of the entire SBC device.

It should be noted that tight arrangement of the fibers is highly desirable since the beam quality increases as the fiber tip separation decreases—the beam quality of a SBC scheme based on a given diffractive grating is determined by fiber tip separation, i.e., the smaller the fiber tip separation gets, the better the beam quality becomes. This may be understood when examining equation (5) which relates the focal length of the lens used to the different wavelengths.

$$FL = \Delta x / g \Delta \lambda \quad (5)$$

were $\Delta x$ is the separation between fiber tips and FL is the focal length.

Since the relative broadening of beam divergence is proportional to FL: $\delta\theta/\theta \propto FL \times g \delta\lambda$, as the focal length, FL, decreases, the effect of the laser band width, $\delta\lambda$, becomes less significant. Thus, attaching the fibers directly to the bulk glass surface eliminates the need for a highly precise bulk spliced fiber laser array (a factor of 2 in sensitivity is expected).

The monolithic design of the SBC devices provided herein, using a single 3D monolithic body that integrally or non-integrally connects to the phase mask of the reflective surface and fixedly connects to the optical fibers, may dramatically reduce alignment sensitivity to physical and mechanical influences such as shocks, vibrations, shakings, thermal changes etc.

According to some embodiments the SBC devices discussed herein may be encased or held by a designated and specially designed casings or holders.

In accordance with some embodiments, the SBC devices disclosed herein may be further advantageous for having the following characteristics:

the multiple (e.g. double) optical path scheme enables the use of spectral bandwidth in the nanometer range (as opposed to a single diffraction scheme which limits the spectral bandwidth to a pico-meter range). This enables the use of various light sources and optical fibers without complicated bandwidth control schemes.

the multiple optical path scheme and the fixated connection of the optical fibers to the monolithic body result in a robust, compact and precise SBC of broadband wavelength spectrum e.g. ranging from 1030 to 1080 nm or from 1900 to 2100 nm without requiring bandwidth control schemes.

since the optical fibers are fixedly connected to the monolithic body, the potential for misalignment is significantly reduced (optionally by many orders of magnitude). There are essentially no moving elements that could lose their alignment during vibrations and/or environmental changes over time.

the combined output optical beam exiting the monolithic body may have (in some configuration) a relatively large beam diameter, which enables power scaleup of the original entering optical beams (E.g. for fiber laser requirements). For example, the combined output optical beam exiting the monolithic body may be characterized by a spot size that is about 3 to 4 times larger than a spot size of an entering optical beam.

Since thermal degradation and optical damage are related to beam intensity, and beam intensity is inversely proportional to the beam area, fiber lasers, using the SBC techniques described herein, can be upgraded to a higher laser power, e.g. to a laser power that is greater by 10-15 times from the power used for impinging a diffraction grating facet by a single beam.

Most of the optical damage risks are due to changes in the medium in which the beams are traveling along with high power density. In the monolithic spectral beam combining schemes described herein, the optical beams are maintained in the bulk of the monolithic body throughout the entire combining process and leave the monolithic body in a much larger diameter, thus, reduce the optical damage threat by many orders of magnitude.

Figure 12:
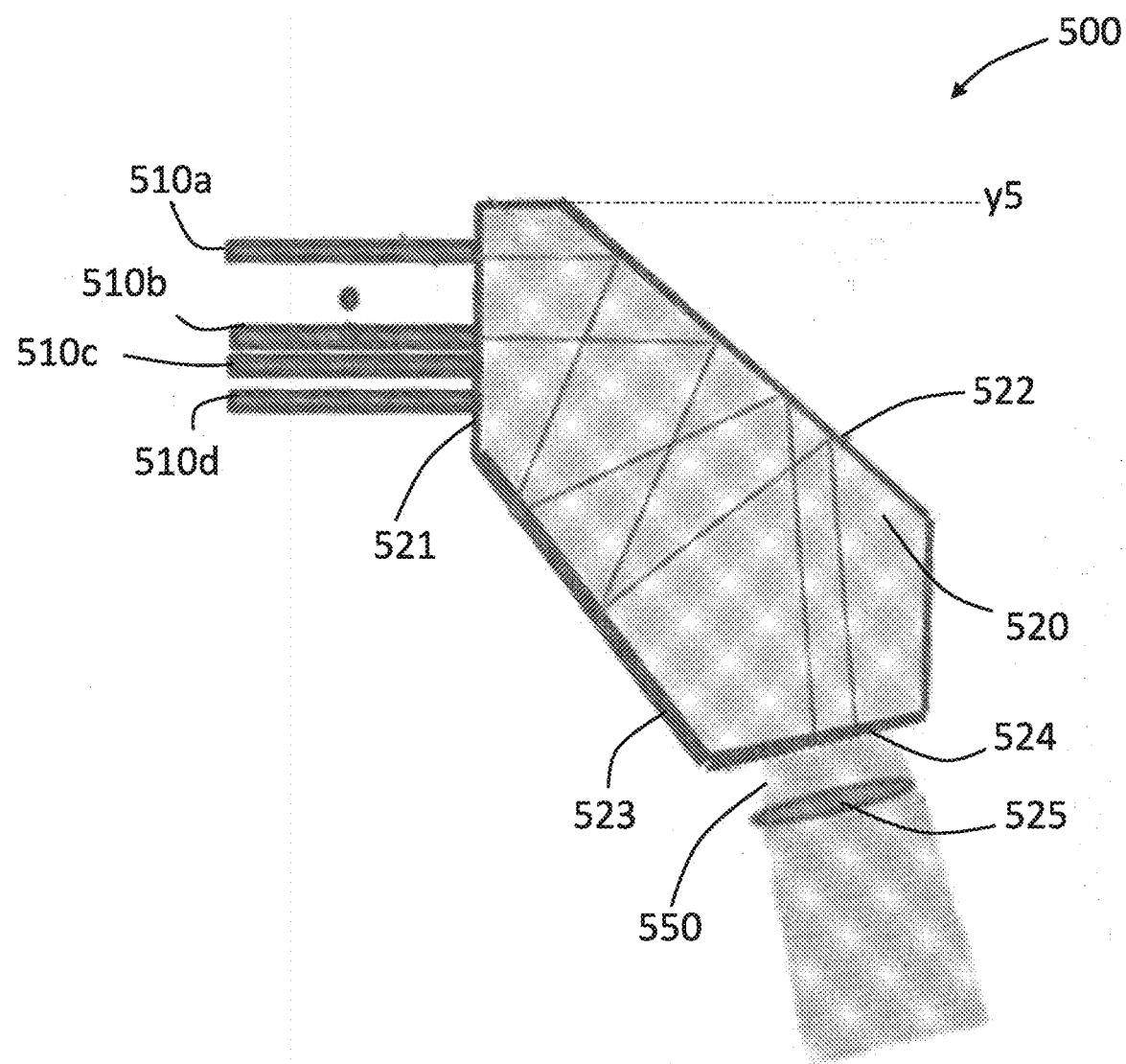
FIG. 12 shows a spectral beam combining device, using a monolithic body with a single diffractive surface and a reflective surface angular thereto, according to some embodiments.

FIG. 12 shows an SBC device 500 in which the reflective surface and the diffractive surface are not positioned in parallel to one another (i.e. are angular to one another), according to some embodiments. The SBC device 500 includes: a plurality of optical fibers such as optical fibers 510a, 510b, 510c and 510d; and a monolithic body 520. The monolithic body 520 includes an input surface 521, a diffractive surface 522 having one or more phase masks such as one or more diffraction gratings masks, a reflective surface 523 and an output surface 524. The monolithic body 520 may include other surfaces for forming the desired angular positioning and/or other geometrical relations between the input, output, diffractive and reflective surfaces 521-524, in relation to one another.

According to some embodiments, a focusing lens 525 may be used in case the exiting combined output optical beam 550 exits the monolithic body 520 in a diverged manner, for collimating the combined output optical beam 550. The lens 525 may be positioned externally from the output surface 524.

According to some embodiments, the entering optical beams enter the monolithic body 520, via its input surface 521, in parallel to one another and to an axis y5, whereas the other surfaces are angular to axis y5, to allow the multi-optical path of each entering optical beam inside the monolithic body. The fixed connection between the monolithic body 520 and the optical fibers 510a-510d is such as to allow the entering optical beams to enter the monolithic body 520 at parallel entry trajectories.

As shown in FIG. 12, the reflective surface 523 in these embodiments, is angular in respect to the diffractive surface 522 as well as to the input and output surfaces 521 and 524.

Figure 13:
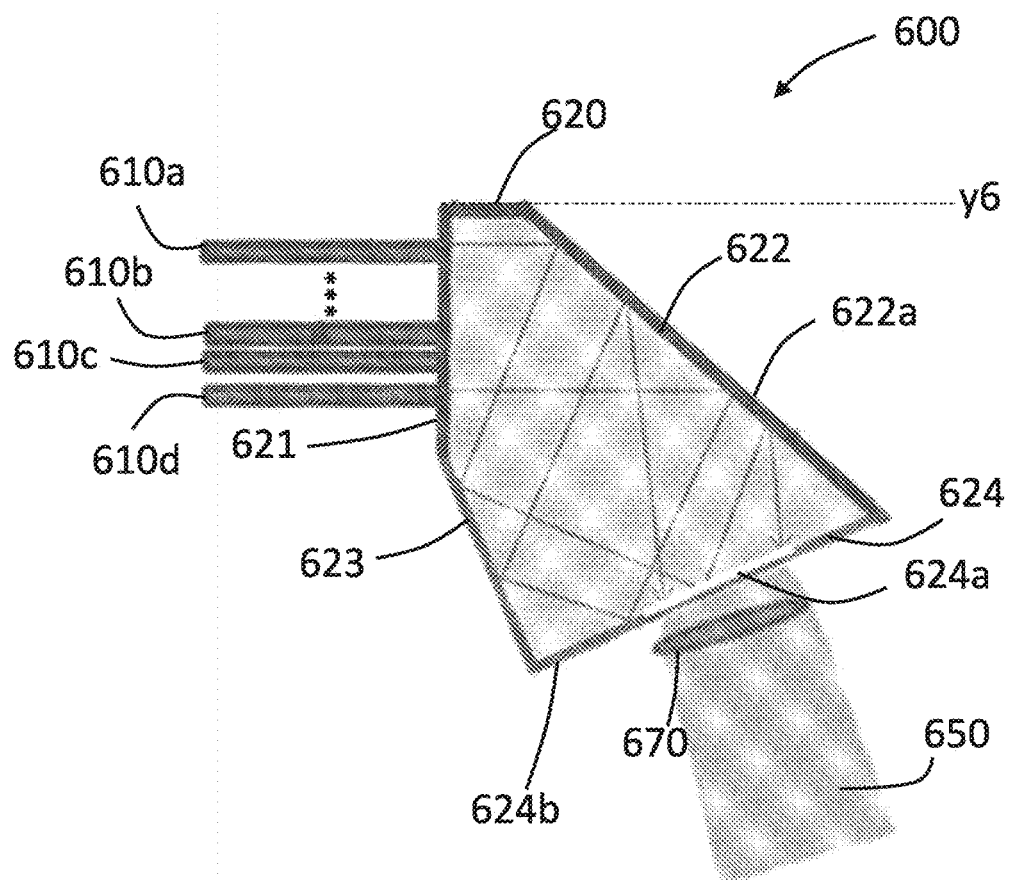
FIG. 13 shows a spectral beam combining device, using a monolithic body with a single diffractive surface and multiple reflective surfaces, according to some embodiments.

FIG. 13 shows an SBC device 600 having a multiple internal reflection scheme, according to some embodiments. The SBC device 600 includes: a plurality of optical fibers such as optical fibers 610a, 610b, 610c and 610d; and a monolithic body 620. The monolithic body 620 may include an input surface 621, a diffractive surface 622 having one or more phase masks such as one or more diffraction gratings phase masks 622a, a reflective surface 623 and an output surface 624, which may be partially reflective. The monolithic body 620 may include other surfaces for forming the desired angular positioning and/or other geometrical relations between the input, output, diffractive and reflective surfaces 621-624, in relation to one another.

According to these embodiments, the output surface 624 includes a transparent area 624a through which the combined output optical beam 650 may exit the monolithic body 620, and a reflective area 624b surrounding the transparent area 624a, for allowing optical beams inside the monolithic body 620 that impinge the non-transparent surrounding reflective area 624b to be directed internally back towards the diffractive surface 622 until they reach the right trajectory angle and exit the output surface 624 via its transparent area 624a.

In these configurations, an optical beam entering from the input surface 621 may be reflected several times by the reflective planes of the reflective surface 623 and/or reflective area 624b, depending on its entry trajectory angle, its respective wavelength and the angular positioning of the surfaces 521-524 in respect to one another.

The reflective surface 623 and/or the reflective area 624b of the output surface 624 may be achieved by one of: coating these surfaces/areas with a reflective coating material, attaching reflective element(s) to a transparent surface of the monolithic body 620 over the respective side thereof.

The phase mask(s) 622a of the monolithic body 620 may be etched, embossed or attached to a side of the monolithic body forming the diffractive surface 622 thereof and may be configured, for example, as a diffraction grating mask.

According to some embodiments, the entering optical beams enter the monolithic body 620, via its input surface 621 in parallel to one another and to an axis y6, whereas the other surfaces may be angular to axis y6, to allow the multi-optical path of each entering optical beam inside the monolithic body. The fixed connection between the monolithic body 620 and the optical fibers 610a-610d is such as to allow the entering optical beams to enter the monolithic body 620 at parallel entry trajectories.

According to some embodiments, the SBC device 600 may include one or more focusing lenses such as focusing lens 670 for collimating the combined output optical beam 650.

According to other embodiments, the SBC device may include additional reflective surfaces additional to or instead of the reflective and/or the output surface, for allowing total internal reflection (TIR) of beams until they are in the right trajectory angle for exiting the monolithic body.

Figure 14:
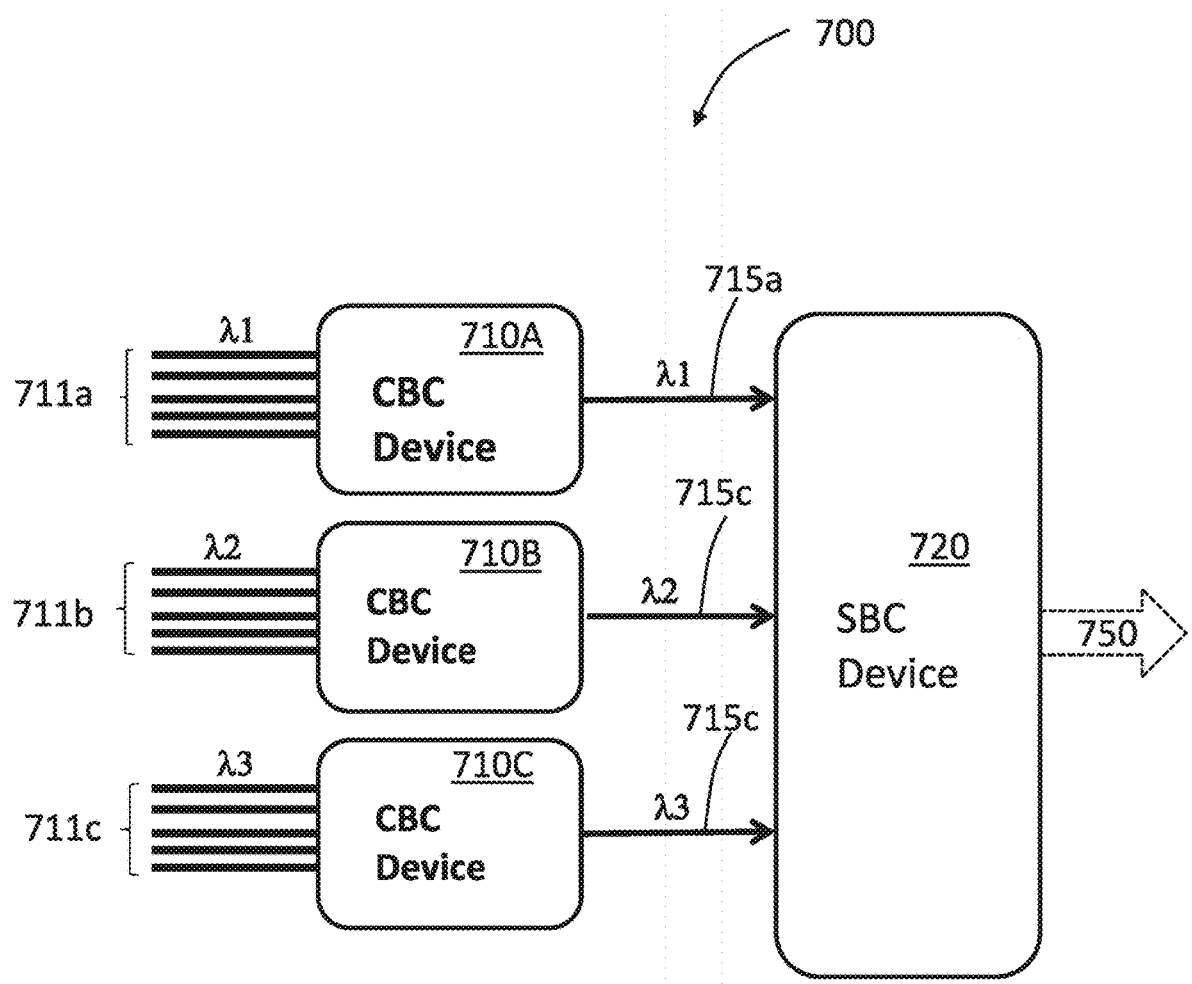
FIG. 14 shows a system for spectral combining of spectrally differentiated optical beams emanating from a plurality of coherent beam combining devices, according to some embodiments.

Aspects of disclosed embodiments pertain to systems that integrate coherent and spectral beam combining devices and techniques. For example, a system may include a plurality of CBC devices, each combining multiple coherent and monospectral optical beams into a combined coherent monospectral output optical beam, where each CBC device is designed to combined and output optical beams of different wavelengths or narrow wavelength bands from one another; and one or more SBC devices, each configured to conduct spectral beam combining of optical beams outputted by the plurality of CBC devices. Reference is made to FIG. 14, showing a system 700 for SBC of multiple spectrally differentiated optical beams emanating from a plurality of CBC devices, according to some embodiments.

The system 700 includes a SBC device 720 configured for spectral combining of spectrally differentiated entering optical beams; and multiple CBC devices such as CBC devices 710A, 710B and 710C, each being configured to conduct CBC for a plurality of coherent entering optical beams and output combined coherent optical beams such as combined coherent optical beams 715a, 715b and 715c of different wavelength, in respect to one another. The SBC device 720 is located and configured such as to spectrally combine all the output optical beams from the multiple CBC devices 710A-710C, such as to enable optical power scaling of entering optical beams that have already been gone through a previous coherent power scaling, outputting a final spectrally combined output optical beam 750.

For example, as shown in FIG. 14, CBC device 710A may be configured to combine and output a coherent combined optical beam of a first wavelength $\lambda 1$, CBC device 710A may be configured to combine and output a coherent combined optical beam of a second wavelength $\lambda 2$ and CBC device 710A may be configured to combine and output a coherent combined optical beam of a third wavelength $\lambda 3$, where $\lambda 1 \neq \lambda 2 \neq \lambda 3$.

According to some embodiments, for each CBC device 710A/710B/710C the coherent entering optical beams entering thereto, may emanate from a plurality of sets of optical fibers such as fiber sets 711a, 711b and 711c, where each fiber set outputs optical beams of different wavelength and is fixedly connected to the respective CBC device 710a, 710b and 710c.

According to some embodiments, the CBC devices 710a, 710b and 710c may be configured according to one or more of the CBC devices discussed above, by having each a phase mask and geometry that corresponds to the respective wavelength or wavelength band of the entering optical beams thereof.

According to some embodiments, the SBC device 720 may be configured according to any one of the SBC devices configurations discussed above, using a configuration enabling the double optical pathway for at least twice impinging a diffractive surface thereof, and in accordance with the specific wavelengths of the optical beams outputted by the CBC devices 710a, 710b and 710c.

According to some embodiments the combined coherent optical beams 715a-715c outputted by the CBC devices 710A-710C, respectively, may be directed towards the SBC device 720, via optical waveguides such as optical fibers, each being configured to direct optical beams of the respective wavelength and/or intensity of its respective CBC device.

Aspects of disclosed embodiments pertain to methods for coherent beam combining, by using any type of CBC device such as any beam combining device described above, having a monolithic body and a phase mask, where the monolithic body is configured to focus entering optical beams into a focal point over which the phase mask is located, where the phase mask is located over a focal plane including the focal point and being configured to combine the optical beams impinging thereof.

FIG. 15 shows a flowchart, illustrating a CBC process for coherent beam combining, using a CBC device having such monolithic body and phase mask. The CBC process may in some embodiments include the steps of:

providing a CBC device, having a monolithic body and a phase mask, where the monolithic body may include at least an input and an output surface, and the phase mask may be located and configured such as to coherently combine optical beams directed through the monolithic body (block 801);

In some embodiments, the method may further include directing multiple coherent optical beams into the monolithic body at specific entry angles in respect to a main axis (e.g. by using multiple light sources and optical fibers fixedly connecting to the input surface of the monolithic body, as described above in regard to embodiments of the beam combining devices) (block 802);

In some embodiments, the method may additionally include directing the entering optical beams inside the monolithic body such that the entering optical beams converge into a focal point, defining a focal plane, where the phase mask may be located over that focal plane (block 803);

In some embodiments, the method may further include combining the optical beams impinging the phase mask of the CBC device (block 804); and In some embodiments, the method may also include outputting a single coherent and combined output optical beam and directing thereof externally from the CBC device (block 805).

Aspects of disclosed embodiments pertain to methods for spectral beam combining of a plurality of spectrally differentiated optical beams, e.g. by using any one of the described above SBC device configuration.

FIG. 16 shows a flowchart illustrating an SBC process, according to some embodiments and which may include the steps of:

Providing a SBC device that has a monolithic body, where the monolithic body may have at least an input surface, an output surface and a diffractive surface and optionally also a reflective surface, the SBC device being configured for SBC through a multi-diffraction optical pathway, e.g. by directing spectrally differentiated entering optical beams, entering therein through the input surface to at least twice imping the diffractive surface (block 811);

In some embodiments, the method may further include directing multiple spectrally differentiated optical beams into the monolithic body e.g. via the input surface of the monolithic body thereof (block 812);

In some embodiments, the method may additionally include combining the entering optical beams by directing thereof inside the monolithic body through a multi-diffraction optical pathway (block 813); and In some embodiments, the method may also include outputting a single multispectral combined output optical beam and directing thereof externally from the SBC device (block 814).

Aspects of disclosed embodiments pertain to cascaded beam combing methods for beam combining of a plurality of optical beams emanating from a set of CBC devices, by using at least one additional beam combining CBC or SBC device, depending on the spectral output of the set of CBC devices.

Examples of such cascading implementations can be shown (yet not limited to) in FIGS. 9 and 14, described above.

Additionally referring to FIG. 17, a cascaded beam combining method may include, according to some embodiments, providing a first set of CBC devices, each being configured to combine a plurality of coherent optical beams entering thereinto and output a coherent combined output optical beam of a specific wavelength or wavelength band, where the combined output optical beams of the CBC devices may be spectrally differentiated, spectrally overlapping or of the same wavelength or wavelength band (block 821).

In some embodiments, the method may further include providing at least one additional combining device, each being configured for combining the output optical beams emanating from the set of CBC devices, where in embodiments in which the CBC devices are configured to output combined output optical beams of overlapping or identical wavelengths, the at least one additional combining device may be a CBC device, configured to combined coherent optical beams of the respective wavelength or wavelength band, and in embodiments in which the CBC devices are configured to output spectrally differentiated combined output optical beams, the at least one additional combining device may be a SBC device, configured to combined spectrally differentiated optical beams (block 822);

In some embodiments, the method may additionally include directing the output optical beams, emanating from the first set of CBC devices, towards an input surface of the at least one additional combing device (block 823); and In some embodiments, the method may also include combining the optical beams entering the at least one additional combining device (block 824); and In some embodiments, the method may further include outputting a single combined final optical beam and directing thereof externally from the at least one additional combining device (block 825).

The cascading beam combining method may use any kind of networking configuration, in which multiple optical beams emanating from multiple beam combining devices may be combined several times in a cascading manner through multiple additional combining devices.

The first set of CBC devices may fixedly connect to multiple optical fibers for directing therein multiple coherent optical beams for CBC thereof.

According to some embodiments, the directing of the optical beams outputted by the first set of CBC device towards the at least one additional combining device may be carried out by air or via optical waveguides.

ADDITIONAL EXAMPLES

Example 1 is a beam combining device for coherent beam-combining of multiple spectrally coherent optical beams emanating from a plurality of optical fibers, comprising: a monolithic body that is at least partially transparent and has at least an input surface and an output surface, wherein the input surface is configured to fixedly connect to the plurality of optical fibers and directing a plurality of coherent entering beams, entering thereinto from the plurality of optical fibers, through the monolithic body; and a phase mask configured for combining of exiting beams, exiting from the output surface of the monolithic body, to form a single combined output beam outputted therefrom.

In example 2, the subject matter of example 1 may include, wherein the monolithic body is configured for focusing all entering beams into a single focal point and wherein the phase mask is positioned over a focal plane that comprises the focal point.

In example 3, the subject matter of example 2 may include, wherein the monolithic body is configured such that the entering beams directed therethrough converge at the focal point at the same exit separation angle from one another, such that the separation angle and the focal point define a focal plane over which the phase mask is positioned.

In example 4, the subject matter of examples 1 to 3 may include, wherein the input surface of the monolithic body is configured such that the optical fibers fixedly connecting thereto are arranged at equal spacing and equal entry separation angle from one another.

In example 5, the subject matter of examples 1 to 4 may include, wherein the phase mask is etched or embossed over the output surface of the monolithic body.

In example 6, the subject matter of examples 1 to 4 may include, wherein the phase mask is attached to the output surface of the monolithic body.

In example 7, the subject matter of examples 1 to 4 may include, wherein the phase mask is embedded in a separate optical element (OE).

In example 8, the subject matter of example 7 may include, wherein the OE is located separately from the output surface of the monolithic body.

In example 9, the subject matter of example 7 may include, wherein the OE is coupled to the output surface of the monolithic body.

In example 10, the subject matter of examples 1 to 9 may include wherein the phase mask is further designed according to at least one of the following characteristics of each of the entering and/or exiting optical beams: beam wavelength; beam wavelength band; beam phase; beam wave front; beam waste; and beam radius.

In example 11, the subject matter of examples 1 to 10 may include, wherein the phase mask comprises a diffraction grating mask.

In example 12, the subject matter of example 11 may include, wherein the phase mask comprises a beam splitter.

In example 13, the subject matter of examples 1 to 12 may include, wherein the input surface of the monolithic body is curved such that the relative entrance angle between each couple of adjacent optical fibers is higher than zero, for directing the beam towards a focal point or focal area at the output surface of the monolithic body.

In example 14, the subject matter of examples 1 to 4 may include, wherein the input surface of the monolithic body is flattened for having the entering optical beams emanating from the optical fibers entering the monolithic body in parallel to one another.

In example 15, the subject matter of examples 1 to 13 may include, wherein the monolithic body comprises at least one additional surface having a reflective inner side to direct the beams from the input surface towards the output surface of the monolithic body by reflecting the beams towards the output surface.

In example 16, the subject matter of example 15 may include, wherein the reflective inner side is formed by having a reflective material coated over the inner side of the at least one additional surface.

In example 17, the subject matter of example 15 may include, wherein the reflective inner side is formed by having a reflective element attached to the inner side of the at least one additional surface.

In example 18, the subject matter of examples 15 to 17 may include, wherein the additional surface is curved.

In example 19, the subject matter of examples 1 to 18 may include, wherein all the optical fibers are designed to output optical beams at the same wavelength and/or wavelength band such that all the entering beams, entering the monolithic body are of the same wavelength and/or wavelength band.

In example 20, the subject matter of examples 1 to 19 may include, wherein each of the optical fibers is a double-clad optical fiber.

In example 21, the subject matter of examples 1 to 20 may include, wherein each of the optical fibers is a doped optical fiber.

In example 22, the subject matter of examples 2 to 3 may include, wherein the monolithic body is configured in a varying refractive indexing configuration, for directing the exiting beams towards the phase mask at equal separation angles such as to create a focal point or focal area of the exiting at the phase mask.

In example 23, the subject matter of examples 22 may include, wherein the varying refractive indexing configuration is such that the refractive index in the monolithic body is gradually changed towards a central axis or a central plain for creating a focusing effect.

Example 24 is a beam combining device for coherent beam-combining of multiple spectrally coherent optical beams, comprising: a plurality of optical fibers configured for outputting coherent optical beams; a monolithic body that is at least partially transparent and has an input surface and an output surface, wherein the monolithic body is configured to fixedly connect to the plurality of optical fibers for directing a plurality of entering optical beams, entering thereinto from the plurality of the optical fibers, from the input surface thereof through the monolithic body; and a phase mask that is configured for combining of exiting beams, exiting from the output surface of the monolithic body, to form a single combined output beam outputted therefrom.

In example 25, the subject matter of example 24 may include, wherein the monolithic body is configured such that the beams directed therethrough exit the output surface thereof at the same exit separation angle from one another and the phase mask is designed in correspondence with the exit separation angle of the exiting beams.

In example 26, the subject matter of examples 24 to 25 may include, wherein the input surface of the monolithic body is configured such that the optical fibers fixedly connecting thereto are arranged at equal spacing and equal entry separation angle from one another.

In example 27, the subject matter of examples 24 to 26 may include, wherein the phase mask is etched or embossed over the output surface of the monolithic body.

In example 28, the subject matter of examples 24 to 26 may include, wherein the phase mask comprises a mask layer that is adhered to the output surface of the monolithic body.

In example 29, the subject matter of examples 24 to 26 may include, wherein the phase mask is embedded in an optical element (OE).

In example 30, the subject matter of example 29 may include, wherein the OE is located separately from the output surface of the monolithic body.

In example 31, the subject matter of example 29 may include, wherein the OE is coupled to the output surface of the monolithic body.

In example 32, the subject matter of examples 24 to 31 may include, wherein the phase mask is further designed according to at least one of the following characteristics of each of the entering and/or exiting beams: beam wavelength; beam wavelength band; beam phase; beam wave front; beam waste; beam radius.

In example 33, the subject matter of examples 24 to 32 may include, wherein the phase mask comprises a phase mask.

In example 34, the subject matter of example 31 may include, wherein the phase mask comprises a diffraction grating.

In example 35, the subject matter of examples 24 to 34 may include, wherein the input surface of the monolithic body is curved such that the relative entrance angle between each couple of adjacent optical fibers is higher than zero, for directing the beam towards a focal point or focal area at the output surface of the monolithic body.

In example 36, the subject matter of examples 24 to 35 may include, wherein the input surface of the monolithic body is flattened for having the beams from the optical fibers entering therein in a parallel manner.

T In example 37, the subject matter of examples 24 to 36 may include, wherein the monolithic body comprises at least one additional surface having a reflective inner side to direct the beams from the input surface towards the output surface of the monolithic body by reflecting the beams towards the output surface.

In example 38, the subject matter of example 37 may include, wherein the reflective inner side is formed by having a reflective material coated over the inner side of the at least one additional surface.

In example 39, the subject matter of example 37 may include, wherein the reflective inner side is formed by having a reflective element attached to the inner side of the at least one additional surface.

In example 40, the subject matter of examples 24 to 39 may include, wherein all the optical fibers are designed to output optical beams at the same wavelength and/or wavelength band such that all the entering beams, entering the monolithic body are of the same wavelength and/or wavelength band.

In example 41, the subject matter of examples 24 to 40 may include, wherein each of the optical fibers is a double-clad optical fiber.

In example 42, the subject matter of examples 24 to 41 may include, wherein each of the optical fibers is a doped optical fiber.

Example 43 is a beam combining device for coherent beam-combining of multiple spectrally coherent optical beams emanating from a plurality of optical fibers, comprising: a monolithic body that is at least partially transparent and has an input surface and an output surface, wherein the input surface is configured to fixedly connect to the plurality of optical fibers and directing a plurality of coherent entering optical beams, entering thereinto from the plurality of optical fibers, towards the output surface thereof, wherein the output surface thereof has a phase mask configured for combining of beams, directed thereto from the input surface of the monolithic body, to form a single combined output beam outputted therefrom.

In example 44, the subject matter of example 43 may include, wherein the monolithic body is configured in a varying refractive indexing configuration, for directing the exiting beams towards the phase mask at equal separation angles such as to create a focal point or focal area of the exiting at the phase mask.

In example 45, the subject matter of example 44 may include, wherein the varying refractive indexing configuration is such that the refractive index in the monolithic body is gradually changed towards a central axis or a central plain for creating a focusing effect.

Example 46 is a system for coherent beam-combining of multiple spectrally coherent optical beams, comprising: a plurality of light sources; a plurality of optical fibers, each configured for guiding of light therethrough originating from one of the plurality of light sources; and a coherent combining device comprising: a monolithic body that is at least partially transparent and has an input surface and an output surface, wherein the monolithic body is configured to fixedly connect to the plurality of optical fibers for directing a plurality of coherent entering optical beams, entering thereinto from the plurality of the optical fibers, from the input surface thereof towards the output surface thereof; and a phase mask that is configured for combining of exiting beams, exiting from the output surface of the monolithic body, to form a single combined output beam outputted therefrom, wherein the monolithic body is configured such that the beams directed therethrough exit the output surface thereof at the same exit separation angle from one another and the phase mask is designed in correspondence with the exit separation angle of the exiting beams.

Example 47 is a beam combining device for coherent beam-combining of multiple spectrally coherent optical beams, comprising: a monolithic body that is at least partially transparent and has at least an input surface and an output surface, wherein the input surface is configured and positioned to direct a plurality of coherent entering optical beams through an optical pathway inside the monolithic body towards the output surface; and a phase mask configured for combining of exiting beams, exiting from the output surface of the monolithic body, to form a single combined output beam outputted therefrom.

Example 48 is a system for coherent beam-combining of multiple spectrally coherent optical beams, comprising: a plurality of coherent beam combining (CBC) devices, each comprising: a monolithic body that is at least partially transparent and has an input surface and an output surface, wherein the monolithic body is configured to fixedly connect to a plurality of optical waveguides for directing a plurality of entering optical beams, entering thereinto from the plurality of the optical waveguides, from the input surface thereof towards the output surface thereof by focusing the entering optical beams onto a focal point located over a focal plane; and a phase mask that is located over the focal plane and configured for combining of exiting beams, exiting from the output surface of the monolithic body, to form a single coherent combined output beam outputted therefrom; and at least one output optical waveguide, being connectable to an output side of the phase mask of at least some of the plurality of CBC devices, the output optical waveguide being located at the focal point of the exiting optical beams such as to direct the combined output optical beam therethrough, wherein at least one of the multiple CBC devices connects through its respective input surface to the output optical waveguides of at least some of the other CBC devices forming thereby a network of CBC devices for additive power scaling of the at least some of the entering optical beams.

Example 49 is a system for combining optical beams, comprising: a plurality of coherent beam combining (CBC) devices, each configured to combine multiple coherent optical beams and output a combined output optical beam, wherein each CBC device is configured for combining and outputting combined output optical beam of different wavelengths or wavelength ranges in respect to one another; and at least one spectral beam combining (SBC) device configured and positioned in respect to the plurality of CBC devices, such as to combine spectrally differentiated entering optical beams, emanating from the plurality of CBC devices, into a single combined multispectral optical beam.

Example 50 is a spectral beam combining (SBC) device for combining a plurality of spectrally differentiated entering optical beams emanating from a plurality of optical fibers, comprising: a monolithic body, which is at least partially transparent and has: an input surface, fixedly connected or connectable to the plurality of optical fibers; a diffractive surface; and an output surface, wherein the monolithic body is configured to direct the entering optical beams, entering therein via the input surface, through a multi-diffraction optical pathway inside the monolithic body by directing the entering optical beams such as to impinge the diffractive surface at least twice, for combining the entering optical beams into a single multispectral combined output optical beam, exiting the monolithic body via the output surface.

In example 51, the subject matter of example 50 may include, wherein the monolithic body is configured to combine the entering optical beams, by directing thereof through the multi-diffraction optical path, such that all optical beams exit the monolithic body, via the output surface thereof, in parallel exit trajectories to one another, thereby forming the combined output optical beam.

In example 52, the subject matter of examples 50 to 51 may include, wherein the monolithic body further comprises at least one reflective surface positioned such as to reflect optical beams at least once, for directing thereof towards the diffractive surface.

In example 53, the subject matter of example 52 may include, wherein one of the at least one reflective surface is positioned in parallel to the diffractive surface and angularly to the diffractive surface.

In example 54, the subject matter of example 52 may include, wherein one of the at least one reflective surface is positioned angularly to the diffractive surface.

In example 55, the SBC device of examples 50 to 51 may further comprise multiple reflective surfaces configured for total internal reflection (TIR) or for partial internal reflection (PIR).

In example 56, the subject matter of example 55 may include, wherein the output surface comprises a reflective area and a transparent area, positioned such as to reflect optical beams impinging over the reflective area back into the monolithic body for being re-directed towards the diffractive surface, and to allow optical beams directed to the transparent area to exit the monolithic body therefrom.

In example 57, the subject matter of examples 50 to 56 may include, wherein all entering optical beams, enter the monolithic body, through the input surface thereof in parallel trajectories to one another.

In example 58, the subject matter of example 57 may include, wherein the trajectories of the entering optical beams at the entry thereof to the monolithic body are angular in respect to the diffractive surface.

In example 59, the subject matter of examples 50 to 58 may include, wherein the monolithic body has additional surfaces to form a three-dimensional (3D) object.

In example 60, the subject matter of examples 50 to 59 may include, wherein at least diffractive surface of the monolithic body is flat.

In example 61, the subject matter of example 60 may include, wherein the input surface and the output surface are flat.

In example 62, the subject matter of examples 52 to 54 may include, wherein the monolithic body configuration and the connection of the optical fibers thereto are designed for directing the entering optical beams, entering in parallel to one another, through a double optical path such as to direct the entering beams from the input surface towards the diffractive surface, from the diffractive surface to the at least one reflective surface, from the at least one reflective surface again to the diffractive surface and from the diffractive surface to the output surface.

In example 63, the subject matter of examples 50 to 62 may include, wherein the entering optical beams are of different wavelengths or wavelength bands thereby spectrally differentiated from one another, and wherein the phase mask is configured in respect to the differences between the wavelengths of the entering optical beams.

In example 64, the subject matter of example 63 may include, wherein the entering optical beams are of wavelengths of equal spectral separation.

In example 65, the subject matter of examples 63 to 64 may include, wherein the phase mask of the diffractive surface comprises at least one of: a diffraction grating mask; a prism.

In example 66, the subject matter of example 65 may include, wherein the at least one diffraction grating mask is configured correspondently to the geometry and dimensions of the monolithic body and to the wavelengths of the entering optical beams.

In example 67, the subject matter of examples 50 to 66 may include, wherein the phase mask is etched, embossed or attached to one side of the monolithic body thereby forming the diffractive surface thereof.

Example 68 is a spectral beam combining (SBC) device for combining a plurality of spectrally differentiated entering optical beams, comprising: a plurality of optical fibers outputting, from an output end thereof, a plurality of spectrally differentiated optical beams; and a monolithic body, which is at least partially transparent and has: an input surface, fixedly connecting to the plurality of optical fibers; a diffractive surface; and an output surface, wherein the monolithic body is configured to direct the entering optical beams, entering therein via the input surface, through a multi-diffraction optical pathway inside the monolithic body by directing the entering optical beams such as to impinge the diffractive surface at least twice, for combining the entering optical beams into a single multispectral combined output optical beam, exiting the monolithic body via the output surface.

In example 69, the subject matter of example 69 may include, wherein the optical fibers comprised doped optical fibers and/or double-cladded optical fibers.

In example 70, the subject matter of examples 68 to 69 may include, wherein the optical fibers are spliced, welded or glued to the input surface of the monolithic body.

In example 71, the subject matter of example 70 may include, wherein the input surface of the monolithic body is flat, and the optical fibers fixedly connect thereto at such that the entering beams enter therethrough at parallel entry trajectories to one another.

In example 72, the subject matter of example 68 to 71 may include, wherein the optical fibers connect to the input surface at equal spacing from one another.

In example 73, the subject matter of example 68 to 72 may include, wherein the phase mask of the diffractive surface comprises at least one of: a diffraction grating mask; a prism.

In example 74, the subject matter of examples 68 to 73 may include, wherein the monolithic body further comprises at least one reflective surface positioned such as to reflect optical beams at least once, for directing thereof towards the diffractive surface.

In example 75, the subject matter of examples 68 to 74 may include, wherein the monolithic body is configured to combine the entering optical beams, by directing thereof through the multi-diffraction optical path, such that all optical beams exit the monolithic body, via the output surface thereof, in parallel exit trajectories to one another, thereby forming the combined output optical beam.

Example 76 is a method for coherent beam combining (CBC) comprising: providing a CBC device having a monolithic body and a phase mask, wherein the phase mask is configured to combine coherent optical beams; directing multiple coherent optical beams into the monolithic body of the CBC device; directing the multiple coherent optical beams inside the monolithic body of the CBC device such as to converge into a focal point defining a focal plane, wherein the phase mask of the CBC device is located over the focal plane; combining the multiple coherent optical beams impinging the phase mask; and outputting a single coherent combined output optical beam.

Example 77 is a method for spectral beam combining (SBC) of spectrally differentiated optical beams, comprising: providing a SBC device comprising a monolithic body that has at least an input surface, an output surface and a diffractive surface; directing multiple spectrally differentiated optical beams into the monolithic body of the SBC device, through the input surface thereof; combining the multiple spectrally differentiated optical beams inside the monolithic body of the SBC device, by directing thereof through a multi-diffraction optical pathway, enabled by directing the multiple spectrally differentiated optical beams to at least twice imping the diffractive surface; and outputting a single multispectral combined output optical beam.

Example 78 is a method for combining multiple optical beams, comprising: providing a first set of coherent beam combining (CBC) devices, each being configured to combine coherent optical beams directed thereto and to output a coherent combined output optical beam; providing at least one additional combining device, configured to combine optical beam; directing combined output optical beams, outputted by the first set of CBC devices, towards an input surface of the at least one additional combining device; combining the directed combined output optical beams, outputted by the first set of CBC devices, by the at least one additional combining device; and outputting a single combined final output optical beam and directing thereof externally from the at least one additional combining device.

In example 79, the subject matter of example 78 may include, wherein the first set of CBC devices are configured to combine and output optical beams of an overlapping, similar or identical wavelength or wavelength band, and wherein the at least one additional combining device is a CBC device.

In example 80, the subject matter of example 78 may include, wherein the first set of CBC devices are configured to output spectrally differentiated output optical beams, and wherein the at least one additional combining device is a spectral beam combining (SBC) device.

While the invention has been described with respect to a limited number of embodiments, these should not be construed as limitations on the scope of the invention, but rather as exemplifications of some of the embodiments.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

It should be understood, that where the claims or specification refer to "a" or "an" element, component, object, property, characteristic and/or feature, such reference is not to be construed as its being only one of the elements. Hence, reference to "an element" or "at least one element" for instance may also encompass "one or more elements" or "at least one element" etc.

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should by no means be construed as limiting and is for illustrative purposes only.

Throughout this application, various embodiments may be presented in and/or relate to a range format. It should be understood, that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

What is claimed is:

1. A spectral beam combining (SBC) device for combining a plurality of spectrally differentiated entering optical beams emanating from a plurality of optical fibers, comprising at least:
a monolithic body, which is at least partially transparent and comprises the following three different surfaces;
an input surface, connectable to the plurality of optical fibers, wherein the input surface is flat such as to enable the entering optical beams to enter the monolithic body therethrough in parallel trajectories;
a single diffractive surface; and
an output surface,
wherein the monolithic body is configured to direct the entering optical beams, entering therein via the input surface, through a multi-diffraction optical pathway inside the monolithic body, by directing the entering optical beams such as to impinge the diffractive surface at least twice, for combining the entering optical beams by outputting a single multispectral combined output optical beam, that is directed to exit the monolithic body via its output surface.

2. The SBC device of claim 1, wherein the monolithic body is configured to combine the entering optical beams, by directing thereof through the multi-diffraction optical path, such that all optical beams exit the monolithic body, via the output surface thereof, in parallel exit trajectories to one another, thereby forming the combined output optical beam.

3. The SBC device of claim 1, wherein the monolithic body further comprises at least one reflective surface configured and positioned for reflecting incoming optical beams and directing them towards the diffractive surface.

4. The SBC device of claim 3, wherein one of the at least one reflective surface is positioned in parallel to the diffractive surface and angularly to the output surface.

5. The SBC device of claim 3, wherein one of the at least one reflective surface is positioned angularly to the diffractive surface.

6. The SBC device of claim 1 further comprises multiple reflective surfaces configured for total internal reflection (TIR) or for partial internal reflection (PIR) inside the monolithic body.

7. The SBC device of the claim 1, wherein the output surface comprises a reflective area and a transparent area, positioned such as to reflect optical beams impinging over the reflective area back into the monolithic body for being re-directed towards the diffractive surface, and to allow optical beams directed to the transparent area to exit the monolithic body therefrom.

8. The SBC device of claim 1, wherein all entering optical beams, enter the monolithic body, through the input surface thereof in parallel trajectories, in respect to one another, wherein the trajectory of each of the entering optical beams when entering the monolithic body is angular in respect to the diffractive surface.

9. The SBC device of claim 1, wherein at least one of: the diffractive surface and/or the output surface of the monolithic body is flat.

10. The SBC device of claim 1, wherein the diffractive surface comprises at least one of: a diffraction grating mask; a diffraction optical element; a prism, and wherein the at least one diffractive surface is configured correspondently to the geometry and dimensions of the monolithic body and to the wavelengths of the entering optical beams.

11. The SBC device of claim 1, wherein the monolithic body configuration and the connection of the optical fibers thereto are designed for directing the entering optical beams, to enter in parallel to one another go through a double optical path such as to direct the entering beams from the input surface towards the diffractive surface, from the diffractive surface to the at least one reflective surface, from the at least one reflective surface again to the diffractive surface and from the diffractive surface to the output surface.

12. The SBC device of claim 1, wherein the diffractive surface comprises an optical phase mask configured in respect to the differences between wavelengths of the entering optical beams.

13. The SBC device of claim 12, wherein the phase mask is etched, embossed or attached to one side of the monolithic body thereby forming the diffractive surface thereof.

14. A spectral beam combining (SBC) device for combining a plurality of spectrally differentiated entering optical beams, comprising:
   a plurality of optical fibers outputting, from an output end thereof, a plurality of spectrally differentiated optical beams; and
   a monolithic body, which is at least partially transparent and comprises at least the following three different surfaces:
      an input surface, fixedly connecting to the plurality of optical fibers, wherein the input surface is flat such as to enable the entering optical beams to enter the monolithic body therethrough in parallel trajectories;
      a single diffractive surface; and
      an output surface,
   wherein the monolithic body is configured to direct the entering optical beams, entering therein via the input surface, through a multi-diffraction optical pathway inside the monolithic body by directing the entering optical beams such as to impinge the diffractive surface at least twice, for combining the entering optical beams into a single multispectral combined output optical beam that is directed to exit the monolithic body via the output surface.

15. The SBC device of claim 14, wherein the optical fibers comprised doped optical fibers and/or double-cladded optical fibers.

16. The SBC device of claim 14, wherein the optical fibers are fixedly connected thereto at such that the entering beams enter therethrough at parallel entry trajectories to one another.

17. The SBC device of claim 14, wherein the optical fibers connect to the input surface at equal spacing from one another.

18. The SBC device of claim 14, wherein the diffractive surface comprises at least one of: a diffraction grating mask; a prism.

19. The SBC device of claim 14, wherein the monolithic body further comprises at least one reflective surface positioned such as to reflect optical beams at least once, for directing thereof towards the diffractive surface.

* * * * *